US010795416B2

(12) United States Patent
Schmelzle et al.

(10) Patent No.: US 10,795,416 B2
(45) Date of Patent: Oct. 6, 2020

(54) HINGED DEVICE

(71) Applicant: Microsoft Technology Licensing, LLC, Redmond, WA (US)

(72) Inventors: Joel J. Schmelzle, Redmond, WA (US); Kabir Siddiqui, Sammamish, WA (US); Karsten Aagaard, Monroe, WA (US); Benoit Guillaume Henri Rouger, Woodinville, WA (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/713,449

(22) Filed: Sep. 22, 2017

(65) Prior Publication Data

US 2019/0094917 A1    Mar. 28, 2019

(51) Int. Cl.
| | | |
|---|---|---|
| *E05D 3/12* | (2006.01) | |
| *G06F 1/16* | (2006.01) | |
| *E05D 5/14* | (2006.01) | |
| *E05D 11/00* | (2006.01) | |
| *E05F 1/12* | (2006.01) | |
| *F16C 11/04* | (2006.01) | |
| *H04M 1/02* | (2006.01) | |
| *E05B 65/00* | (2006.01) | |

(52) U.S. Cl.
CPC ............. *G06F 1/1683* (2013.01); *E05D 5/14* (2013.01); *E05D 11/0054* (2013.01); *E05D 11/0081* (2013.01); *E05F 1/1253* (2013.01); *F16C 11/04* (2013.01); *E05B 65/0067* (2013.01); *E05D 3/122* (2013.01); *E05Y 2900/606* (2013.01); *G06F 1/1616* (2013.01); *G06F 1/1681* (2013.01); *H04M 1/022* (2013.01)

(58) Field of Classification Search
CPC .. E05D 3/06; E05D 3/12; E05D 3/122; E05D 11/0081; G06F 1/1681; G06F 1/1683
See application file for complete search history.

(56) References Cited

U.S. PATENT DOCUMENTS 4,004,771 A * 1/1977 Plevak .................... E21D 15/54
                                                         248/357
4,821,382 A * 4/1989 Puschkarski .......... E04B 2/7431
                                                           24/298

(Continued)

FOREIGN PATENT DOCUMENTS

EP    2528307 A1    11/2012

OTHER PUBLICATIONS

"International Search Report and Written Opinion Issued in PCT Application No. PCT/US2018/039217", dated Jan. 18, 2019, 28 Pages.

*Primary Examiner* — Emily M Morgan
(74) *Attorney, Agent, or Firm* — Rainier Patents, P.S.

(57) ABSTRACT

The description relates to hinged devices, such as hinged computing devices. One example can include a hinge assembly that rotatably secures a first portion and a second portion relative to a hinge axis and defines a planar conductor path between the first and second portions through the hinge assembly. The example can also include a pop-up arm that compresses a spring when the first portion and the second portion are rotated to a closed orientation, and wherein the compressed spring creates a bias to rotate the first and second portions from the closed orientation to an open orientation.

15 Claims, 19 Drawing Sheets

(56) References Cited

U.S. PATENT DOCUMENTS

| | | | | |
|---|---|---|---|---|
| 6,168,341 B1 * | 1/2001 | Chene | E05D 11/0081 | 16/228 |
| 8,757,797 B2 * | 6/2014 | Medana | G02C 1/04 | 351/153 |
| 9,192,060 B2 * | 11/2015 | Kawasaki | H04M 1/022 | |
| 2005/0055807 A1 * | 3/2005 | Maatta | G06F 1/1616 | 16/366 |
| 2005/0283945 A1 * | 12/2005 | Pan | E05D 3/10 | 16/221 |
| 2006/0238970 A1 * | 10/2006 | Ukonaho | H04M 1/022 | 361/679.01 |
| 2007/0101541 A1 * | 5/2007 | Yin | H04M 1/022 | 16/221 |
| 2007/0151381 A1 * | 7/2007 | Pelkonen | G06F 1/1616 | 74/437 |
| 2007/0261202 A1 * | 11/2007 | Jung | H04M 1/0216 | 16/252 |
| 2008/0125195 A1 * | 5/2008 | Maenpaa | H04M 1/0216 | 455/575.3 |
| 2010/0180404 A1 * | 7/2010 | Chang | E05D 5/08 | 16/387 |
| 2010/0205777 A1 * | 8/2010 | Kim | E05D 11/0081 | 16/386 |
| 2011/0102986 A1 * | 5/2011 | Asakura | G06F 1/1616 | 361/679.01 |
| 2012/0188692 A1 * | 7/2012 | Du | G06F 1/1616 | 361/679.01 |
| 2012/0206864 A1 * | 8/2012 | Bohn | G06F 1/1616 | 361/679.01 |
| 2012/0257368 A1 * | 10/2012 | Bohn | H04M 1/022 | 361/809 |
| 2015/0031224 A1 * | 1/2015 | Dreisewerd | E05D 3/186 | 439/165 |
| 2018/0209473 A1 * | 7/2018 | Park | F16C 11/04 | |
| 2018/0324964 A1 * | 11/2018 | Yoo | H05K 5/0226 | |
| 2018/0356858 A1 * | 12/2018 | Siddiqui | H04M 1/0216 | |
| 2018/0363341 A1 * | 12/2018 | Siddiqui | E05D 3/06 | |

* cited by examiner

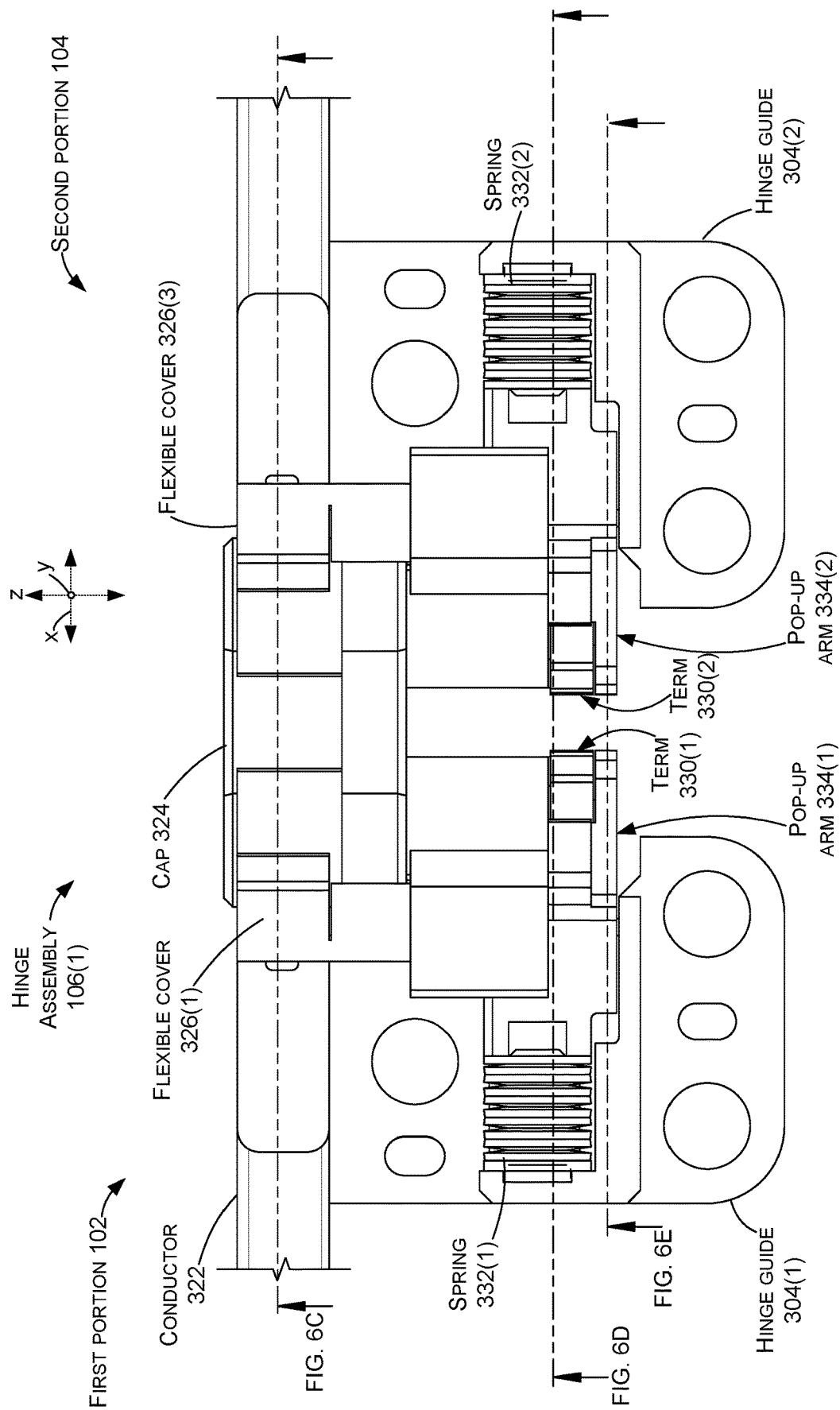

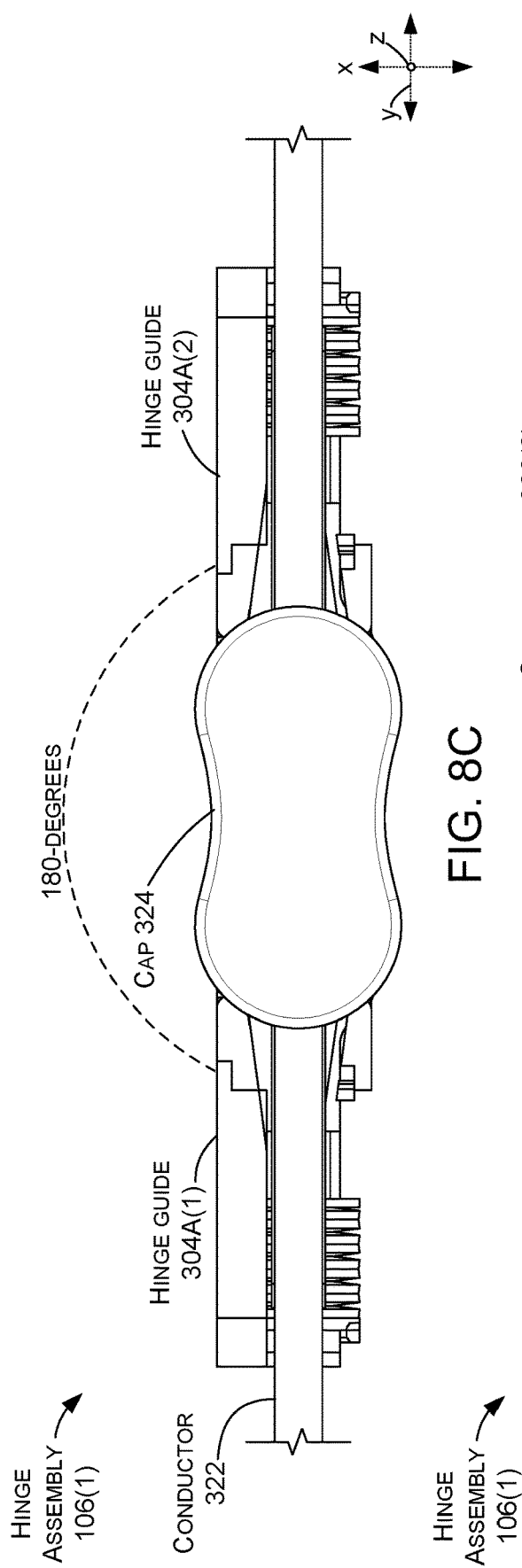
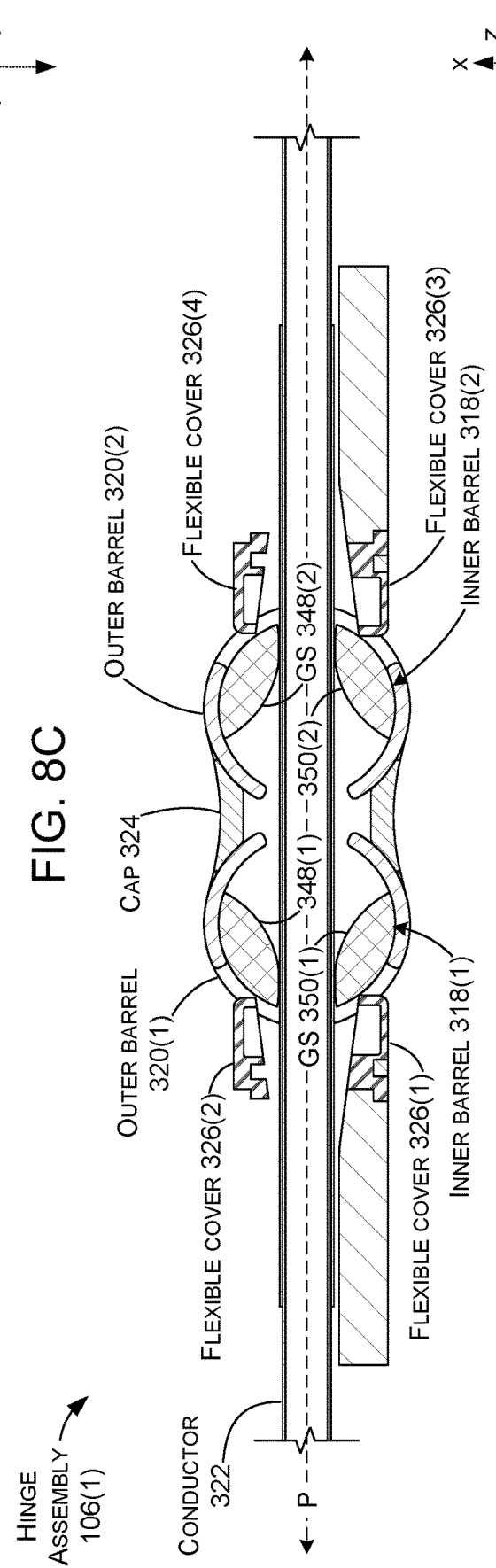
FIG. 8C
FIG. 8D

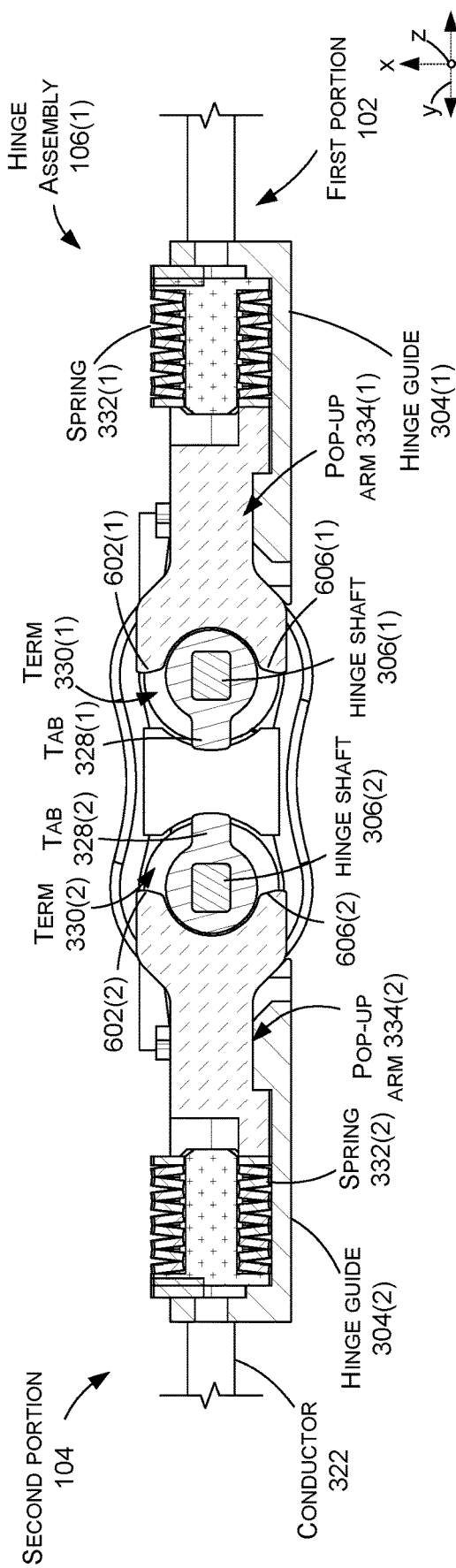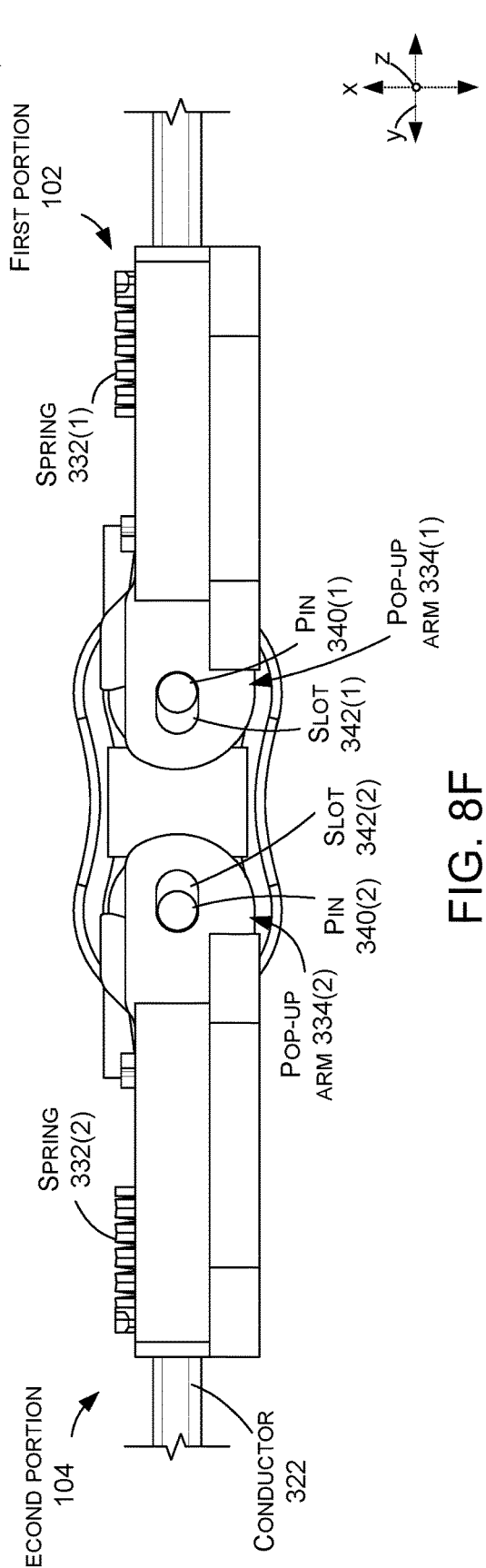
FIG. 8E
FIG. 8F

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 6B, 6C, 7B, 7C, 8B, and 8C show elevational views of example devices in accordance with some implementations of the present concepts.

FIGS. 6D-6F, 7D-7F, and 8D-8F, show sectional views of example devices in accordance with some implementations of the present concepts.

DESCRIPTION

The present concepts relate to devices, such as computing devices employing hinge assemblies that can rotationally secure first and second device portions relative to a hinge axis, such as a first hinge axis that relates to the first portion and a second hinge axis that relates to the second portion. Some of the present hinge assemblies can be viewed as including a 'pop-up' feature in that the hinge assembly can automatically open the hinge from a closed position when activated by a user. Alternatively or additionally, some of the present hinge assemblies can offer a path for a conductor through the hinge assembly that only exposes the conductor to a single axis of rotation during rotation of the first and second portions.

Figure 1:
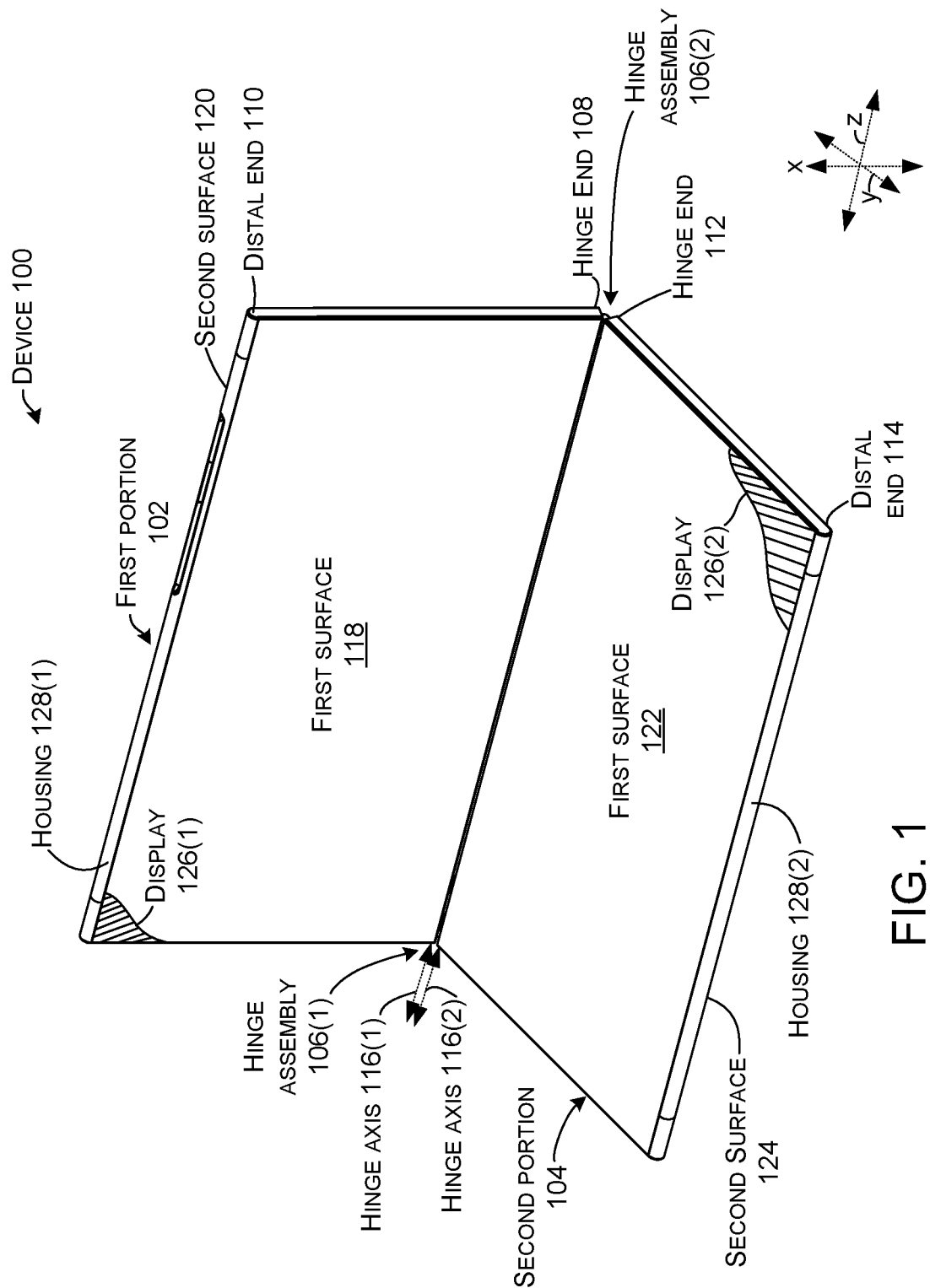
FIGS. 1, 2A-2D, 3A, 6A, 7A, and 8A show perspective views of example devices in accordance with some implementations of the present concepts.

Introductory FIG. 1 shows an example device 100 that has first and second portions 102 and 104 that are rotatably secured together by hinge assemblies 106. In the illustrated implementation, two hinge assemblies 106(1) and 106(2) are employed, but other implementations could employ a single hinge assembly or more than two hinge assemblies.

The first portion 102 can extend from a hinge end 108 to a distal end 110. The second portion 104 also can extend from a hinge end 112 to a distal end 114. The hinge assemblies 106 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 are supported by housing 128. For example, the displays 126 can be positioned on the first and/or second surfaces 118, 120, 122, and/or 124, respectively. In the illustrated configuration, the displays 126 are positioned on first surfaces 118 and 122, respectively.

Figure 2A:
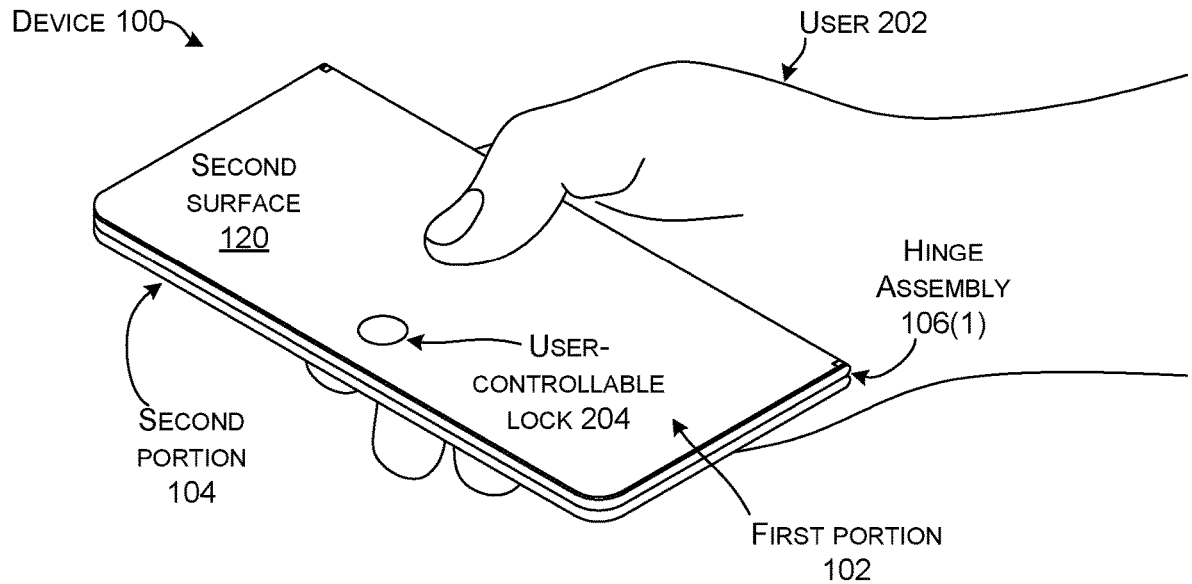

FIGS. 2A-2D collectively show a use case scenario of device 100. FIG. 2A starts with device 100 in the closed orientation where the first and second portions 102 and 104 are positioned parallel to and against one another and are rotatably secured by hinge assemblies 106. In this case, the second surfaces are facing outwardly with the first portion's second surface 120 facing the reader and the second portion's second surface 124 facing the user's palm. The first surfaces are facing inwardly and first surface 122 is visible to the reader in FIG. 2C. The closed orientation can be very compact and easy for the user 202 to transport. For instance, the device may fit in the user's pocket. Further, the first surfaces can be protected in this closed orientation by the second surfaces.

In this implementation, device 100 can also feature a user-controllable lock 204. The user-controllable lock 204 can function to maintain the first and second portions 102 and 104 in the closed orientation unless released by the user 202. In this example, the hinge assemblies 106 also include a pop-up feature that biases the first and second portions 102 and 104 away from each other from the closed orientation.

Figure 2B:
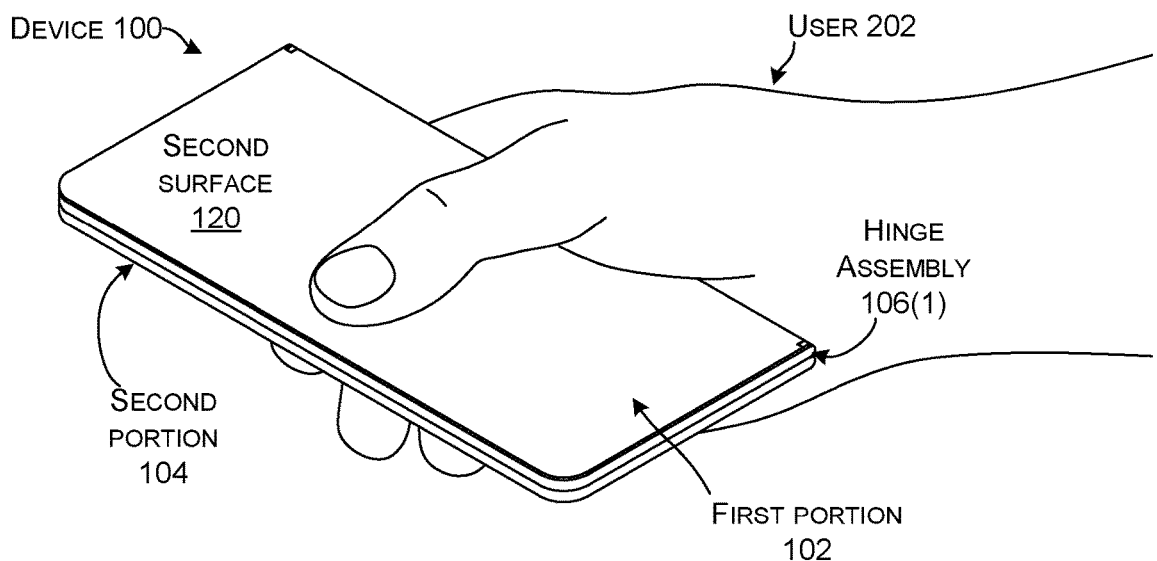

Assume at this point the user 202 wants to open the device 100. For instance, the user may want to be able to view displays (126, FIG. 1). As shown in FIG. 2B, to open the device the user 202 can simply engage the user-controllable lock 204. In this implementation, the user can engage the user-controllable lock with a single digit (in the illustration his/her thumb) to activate the user-controllable lock and release the first and second portions 102 and 104.

Figure 2C:
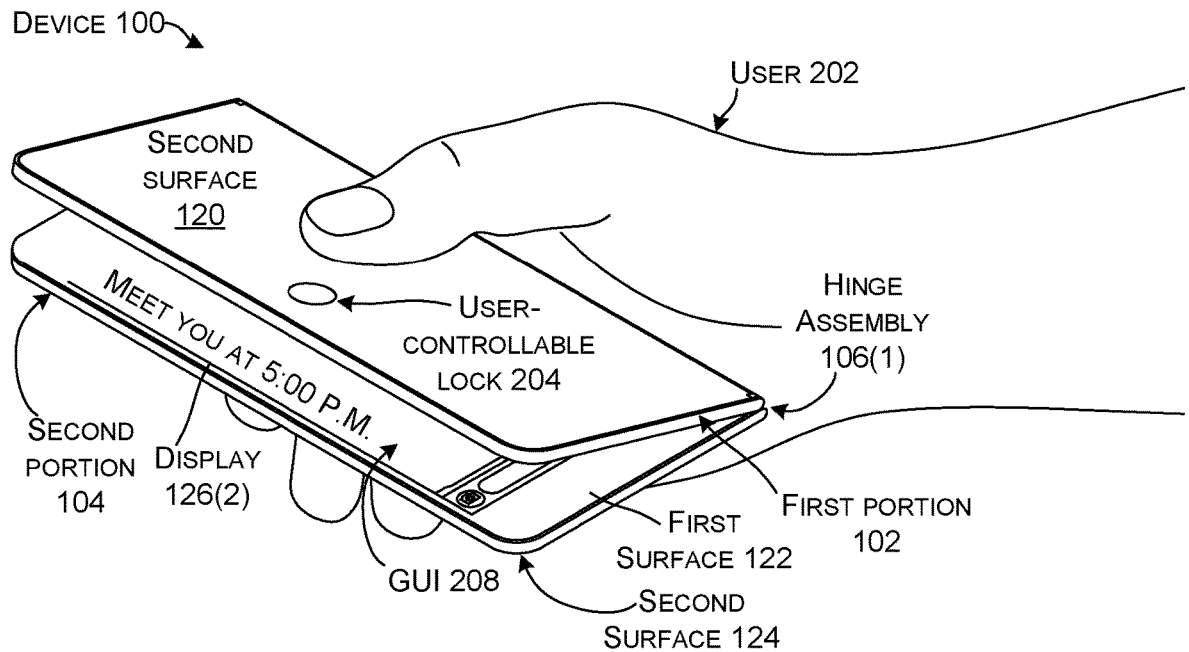

As shown in FIG. 2C, responsive to the user 202 releasing the user-controllable lock 204, the device 100 can automatically open the first and second portions 102 and 104 a few degrees without further user effort. In this case, the hinge assemblies 106 provide a force that biases the first and second portions apart from the closed orientation unless the user-controllable lock maintains the closed orientation. This bias can be viewed as a 'pop-up' feature. Further, once the device is popped-up, the device can maintain the orientation without user intervention (e.g., the user doesn't have to hold the device open).

Figure 2D:
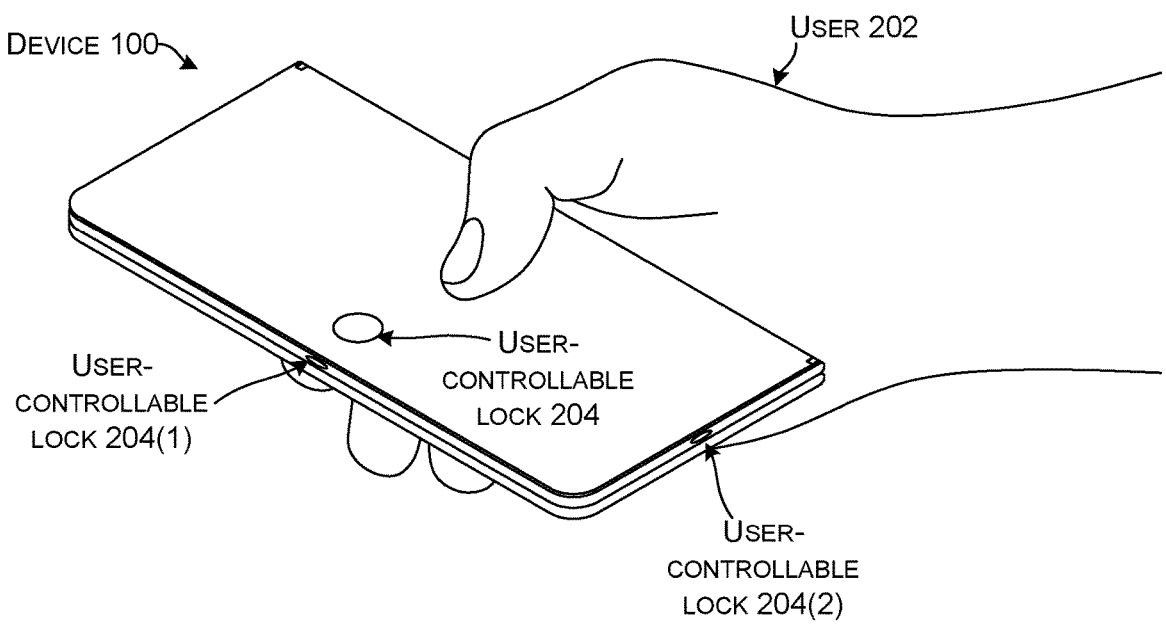

The pop-up feature can allow the user 202 to easily manually open the display 126 further if desired, and/or the user can view some or all of the displays at this point. For instance, in this example a graphical user interface (GUI) 208 shows that the user has a new text message on display 126(2) that says, "Meet you at 5:00 P.M." The user can easily view the text without further manipulation of the device portions. If the user wants to text back or perform other actions, the user can easily open the device further with one hand. In this case, assume the user is done, and can close the device 100 simply by pressing down with his/her thumb until the device is closed, and the user-controllable lock 204 re-engages as shown in FIG. 2D. Note that in this implementation, the device sensed that only a portion of the displays were visible in the pop-up orientation of FIG. 2C, and so the device customized the GUI for this orientation. A different GUI may be generated if the user opens the device to a different orientation.

Note that the illustrated implementation employs the user-controllable lock 204 on the second surface 120. FIG. 2D shows two alternative user-controllable lock locations on the side of the device 100 as indicated at 204(1) and 204(2).

The side locations can allow a single user-controllable lock to be accessed in both the zero-degree orientation and the 360-degree orientation.

FIGS. 3A, 3B and 6A-8F collectively show details of example hinge assembly 106(1).

Figure 3A:
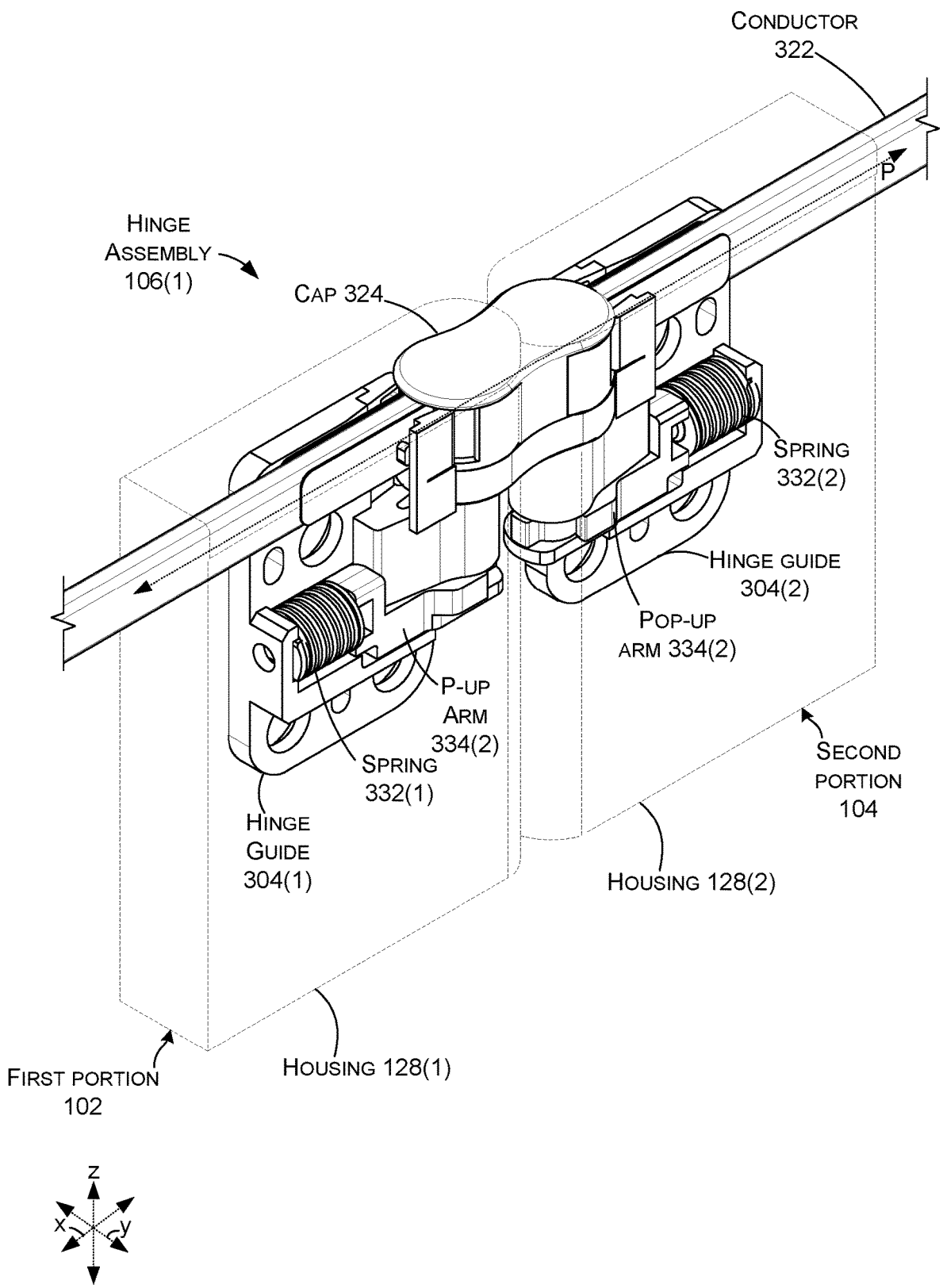
Figure 3B:
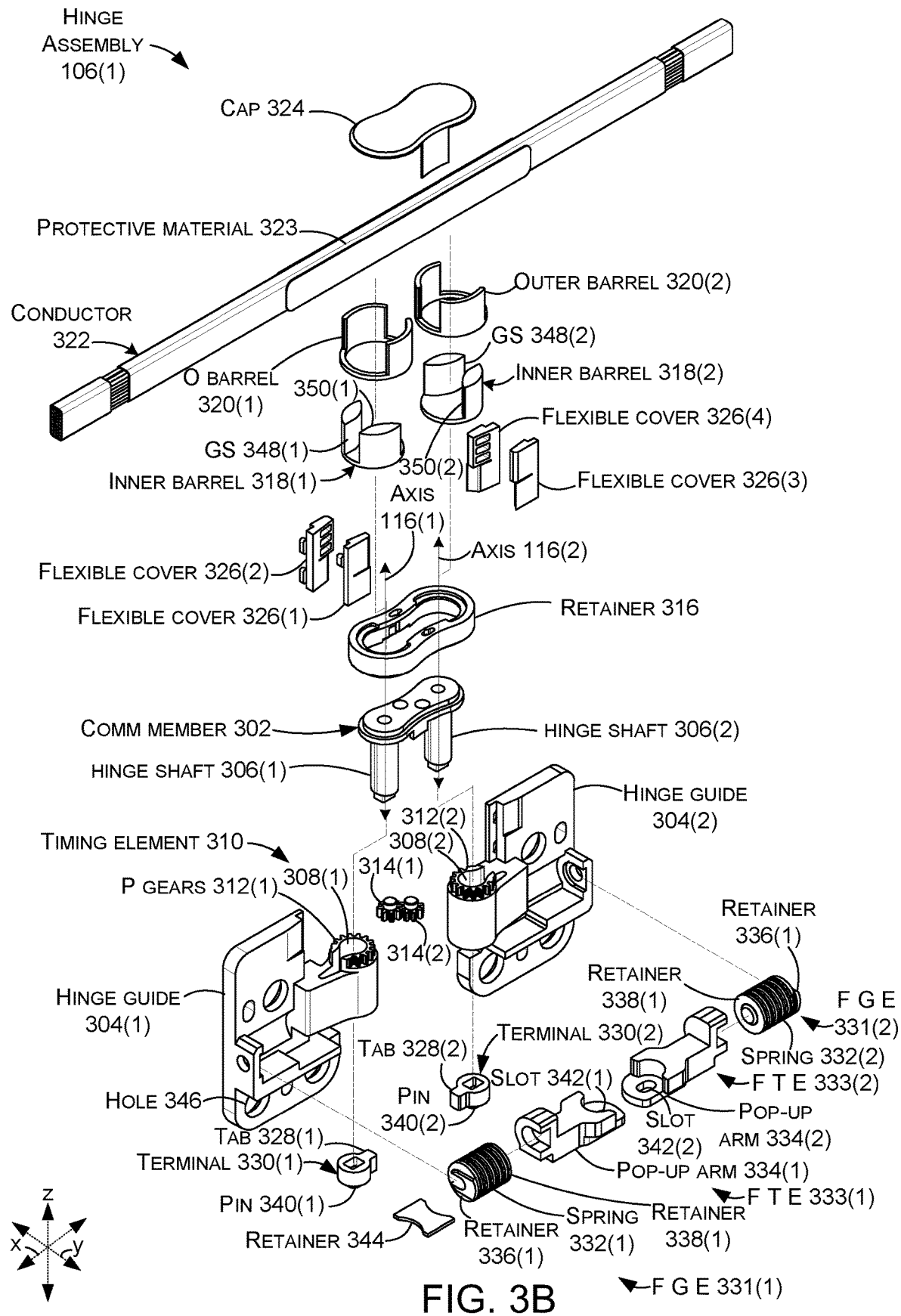
FIGS. 3B, 4, and 5 show exploded perspective views of example devices in accordance with some implementations of the present concepts.

FIG. 3A is a perspective view of example hinge assembly 106(1) and FIG. 3B is an exploded view of hinge assembly 106(1) in the 180-degree orientation. The hinge assembly 106(1) can include a communication member 302 and hinge guides 304. The communication member 302 can define hinge shafts 306 that are received in apertures 308 that are defined by the hinge guides 304.

The hinge assembly 106(1) can also include a timing element 310 that synchronizes rotation (e.g., extent of rotation) of the first and second portions 102 and 104 around the first and second hinge axes 116. For instance, the timing element 310 can ensure that 20 degrees of rotation around the first hinge axis 116(1) simultaneously produces 20 degrees of rotation around the second hinge axis 116(2).

In the illustrated implementation, the timing element 310 can be manifest as gears. For instance, the hinge guides 304 can define primary gears 312 that can interact with intervening or secondary gears 314. The secondary gears 314 are rotatably secured relative to primary gears 312 by retainer 316.

The communication member 302 can also receive nested inner and outer barrels 318 and 320 in a rotational relation (e.g., the inner and outer barrels are secured relative to the communication member and can rotate around the hinge axes 116. A conductor 322, such as traditional insulated wire(s)s and/or a flexible printed circuit(s) (FPC) can pass from portion 102 through the inner and outer barrels 318 and 320 and to the second portion 104. The conductor can be associated with a protective material 323. The protective material can provide abrasion resistance to the conductor, maintain cross-sectional integrity of the conductor (e.g., keep a rectangular conductor rectangular), and/or influence bending characteristics of the conductor to reduce pinching/binding. In the illustrated configuration, the protective material 323 is manifest as metal strips on both sides of the conductor 322. The conductor 322 can be retained by a cap 324, which secures to retainer 316 over the inner barrels 318, and outer barrels 320. Flexible covers 326 can extend between the outer barrels 320 and the conductor 322 to reduce foreign objects, such as dust and/or lint, among others, entering the hinge assembly 106(1), such as the primary and secondary gears 312 and 314.

The hinge shafts 306 can terminate at tabs 328. In some cases, the tabs 328 can be integral to the hinge shafts 306. In other case, the tabs can be on terminals 330. The terminals 330 can be secured to the hinge shafts 306 in a non-rotational fashion. In the illustrated example, the terminals 330 are keyed to the terminus of the hinge shafts 306 to prevent rotation. In the illustrated configuration, the terminals 330 can be secured to the hinge shafts 306 after the hinge shafts are passed through apertures 308. This configuration can allow the apertures 308 to be designed without regard to the geometry of the tabs and instead with regard to creating friction on the hinge shafts. Thus, the apertures 308 in the hinge guides 304 can act as friction cylinders on the hinge shafts 306.

Force generating elements (e.g., biasing elements) 331, such as springs 332 can operate relative to force transferring elements 333, such as hinge guides 304 and/or pop-up arms 334. In this case, the springs 332 are positioned between the hinge guides 304 and the pop-up arms 334. Retainers 336 and 338 retain the springs 332 relative to the hinge guides 304 and the pop-up arms 334, respectively.

The tabs 328 can include pins 340 that can be received in elongate slots 342 in the pop-up arms 334. The elongated slots 342 can allow relative movement between the pop-up arms 334 and the tabs 328 transverse to the hinge axes 116, but can limit relative movement in other directions. A retainer 344 can be positioned between the tabs 328 and the pop-up arms 334 between the elongate slots 342.

In the illustrated implementation, the hinge guides 304 can be fixed to the first and second portions 102 and 104, such as by fasteners (not shown) through holes 346 (not all of which are designated with specificity) into housing 128.

In the illustrated example, the inner barrels 318 can define guide surfaces 348 and 350. The guide surfaces 348 and 350 can define a path P of the conductor 322 through the hinge assembly 106(1) that maintains a minimum bend radius of the conductor during rotation of the first and second portions. The minimum bend radius can prevent crimping and/or other damage to the conductor during rotation of the first and second portions 102 and 104. This aspect will be described in more detail below relative to FIGS. 6D, 7D, and 8D.

Figure 4:
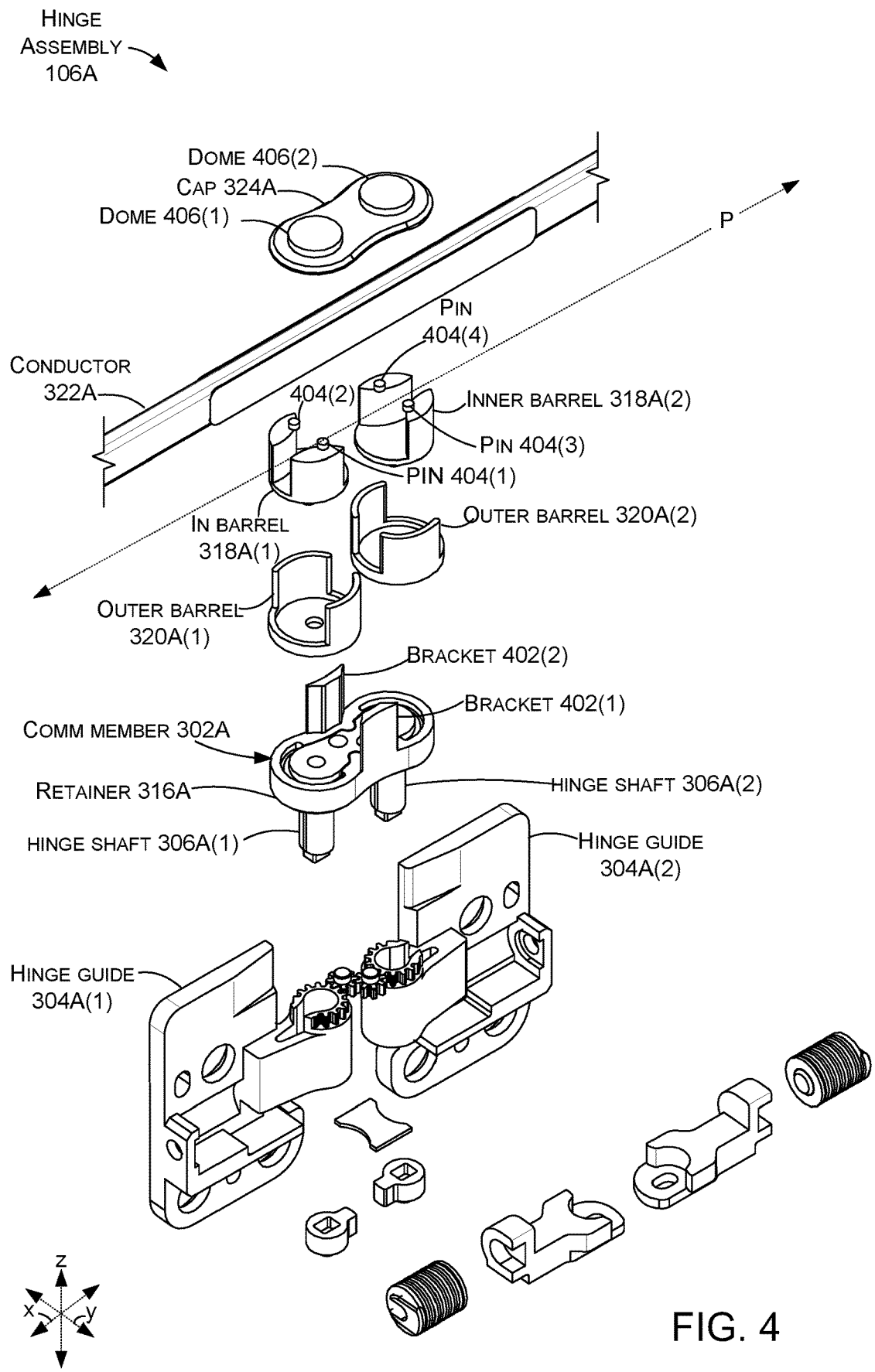
Figure 5:
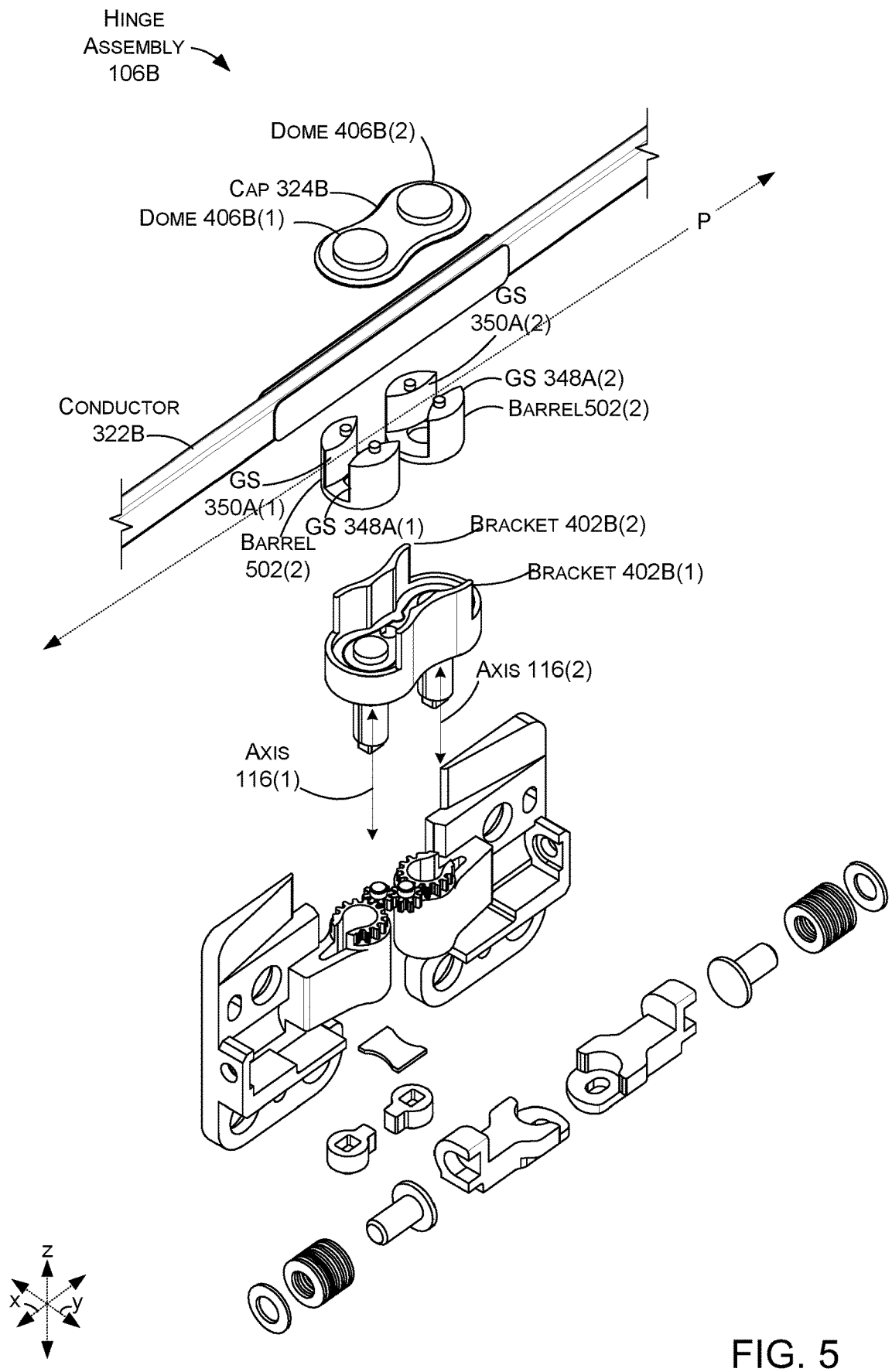

FIGS. 4 and 5 illustrate two additional example hinge assemblies 106A and 106B. A majority of the elements of hinge assemblies 106A and 106B are similar to those described above relative to hinge assembly 106(1) and as such are not re-introduced or discussed here.

As shown in FIG. 4, in hinge assembly 106A, the communication member 302A includes retainer 316A. Further, the communication member 302A defines brackets 402 that cooperatively interact with the inner and outer barrels 318A and 320A to define path P for the conductor 322A. The inner barrels 318A can define pins 404 that are received in domes 406 of the cap 324A to retain the inner barrels while allowing rotation as defined by the domes.

FIG. 5 shows hinge assembly 106B with expanded brackets 402B. The brackets operate cooperatively with a single barrel 502 to define path P for the conductor 322B.

Figure 6A:
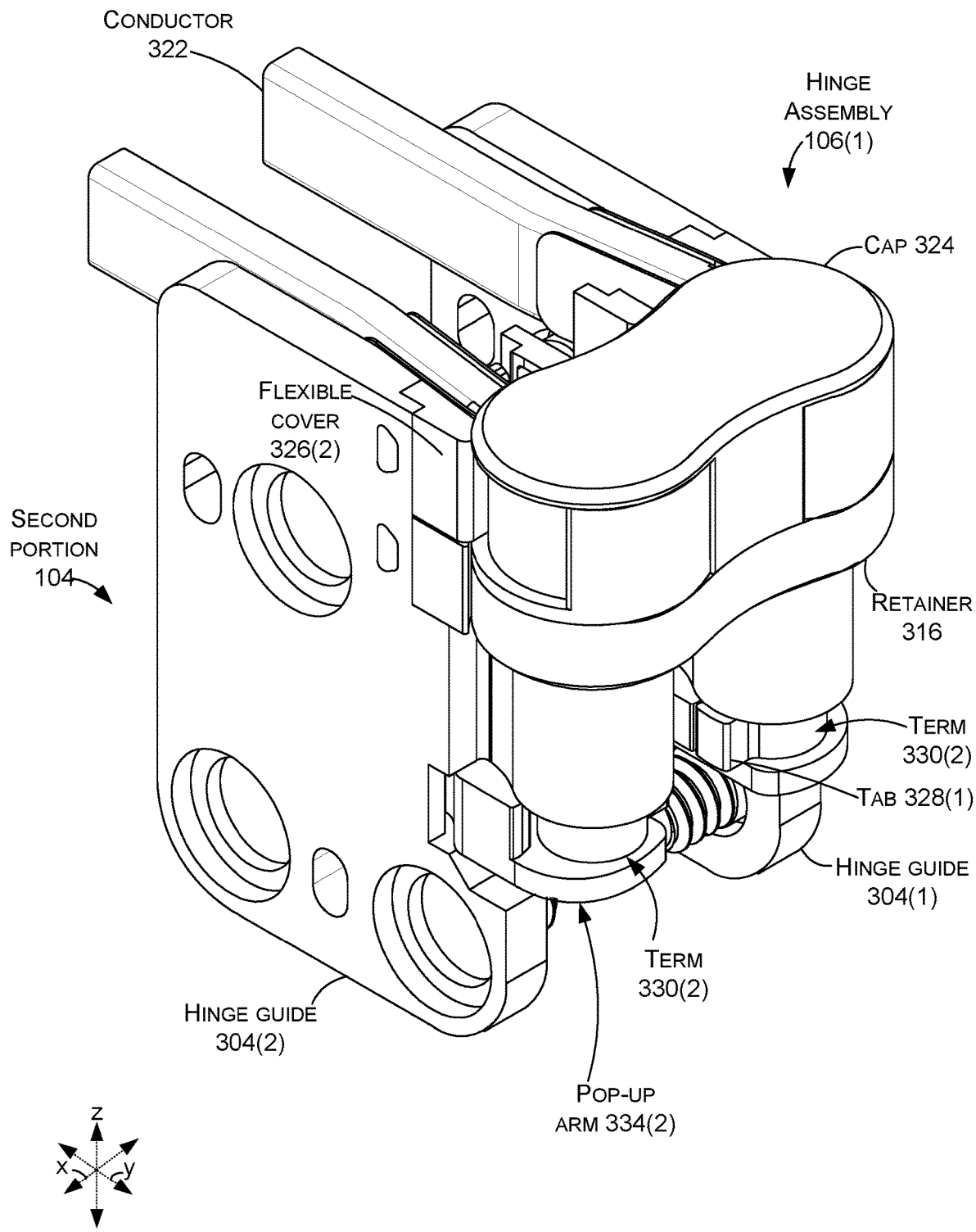
Figure 6B:
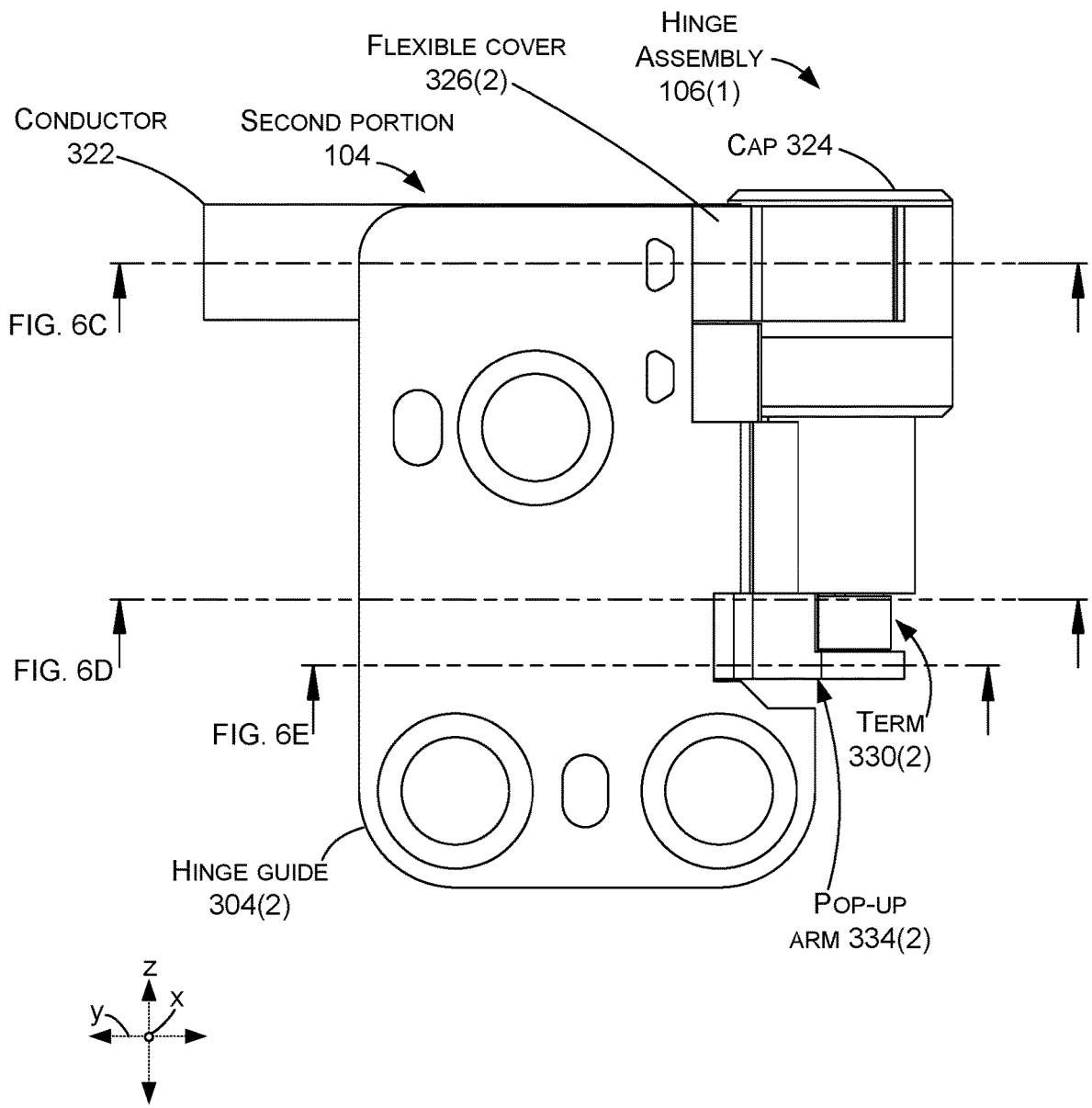
Figure 6C:
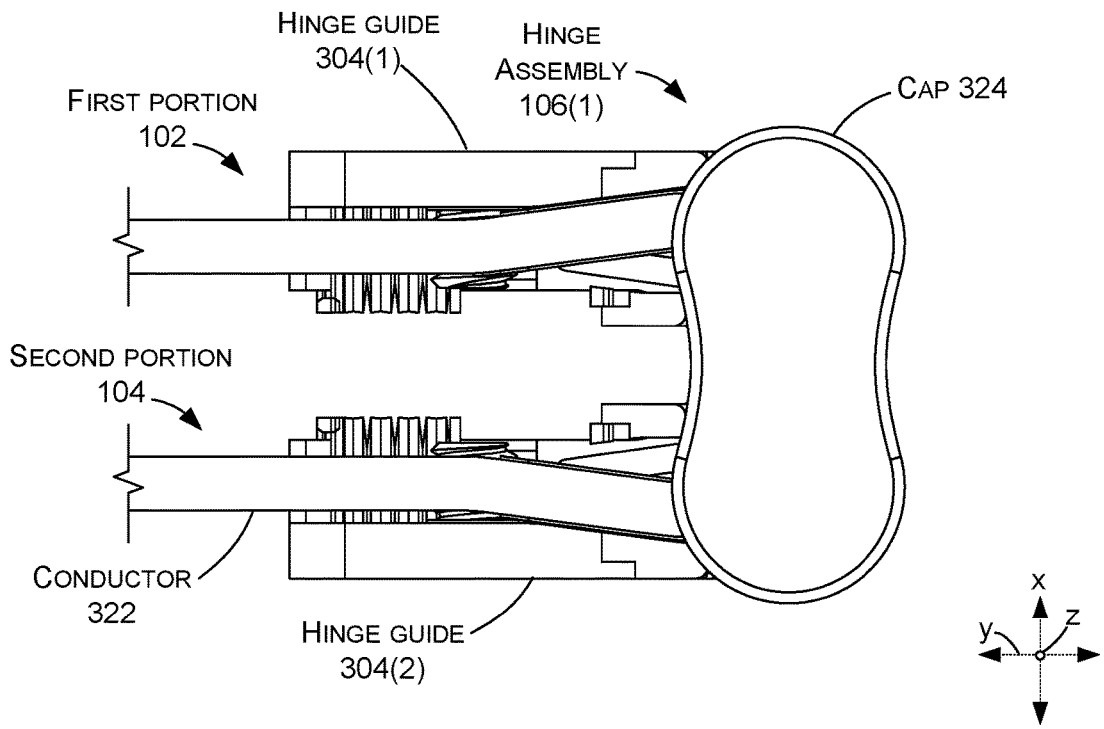

FIGS. 6A-8F collectively show features of the hinge assembly 106(1) during rotation of the first and second portions 102 and 104 through several orientations. FIGS. 6A-6F show the first and second portions 102 and 104 (e.g., the hinge guides 304(1) and 304(2)) parallel to one another at a zero-degree (e.g., closed) orientation similar to FIG. 2A. FIG. 6A is a perspective view, FIG. 6B is a (side) elevational view (e.g., parallel to the hinge axes 116), and FIG. 6C is a (top) elevational view. FIGS. 6D-6F are sectional views as indicated in FIG. 6B. FIGS. 7A-7F are similar views to FIGS. 6A-6F, respectively at a 30-degree orientation rather than a zero-degree orientation. FIGS. 8A-8F are similar views at a 180-degree (e.g. parallel) orientation. Note that while the drawings are organized by orientation, it may be helpful for the reader to also compare specific views at multiple orientations. For instance, the function of the elements shown in FIG. 6D may be understood by reviewing FIG. 6D in combination with FIGS. 7D and/or 8D.

Figure 6D:
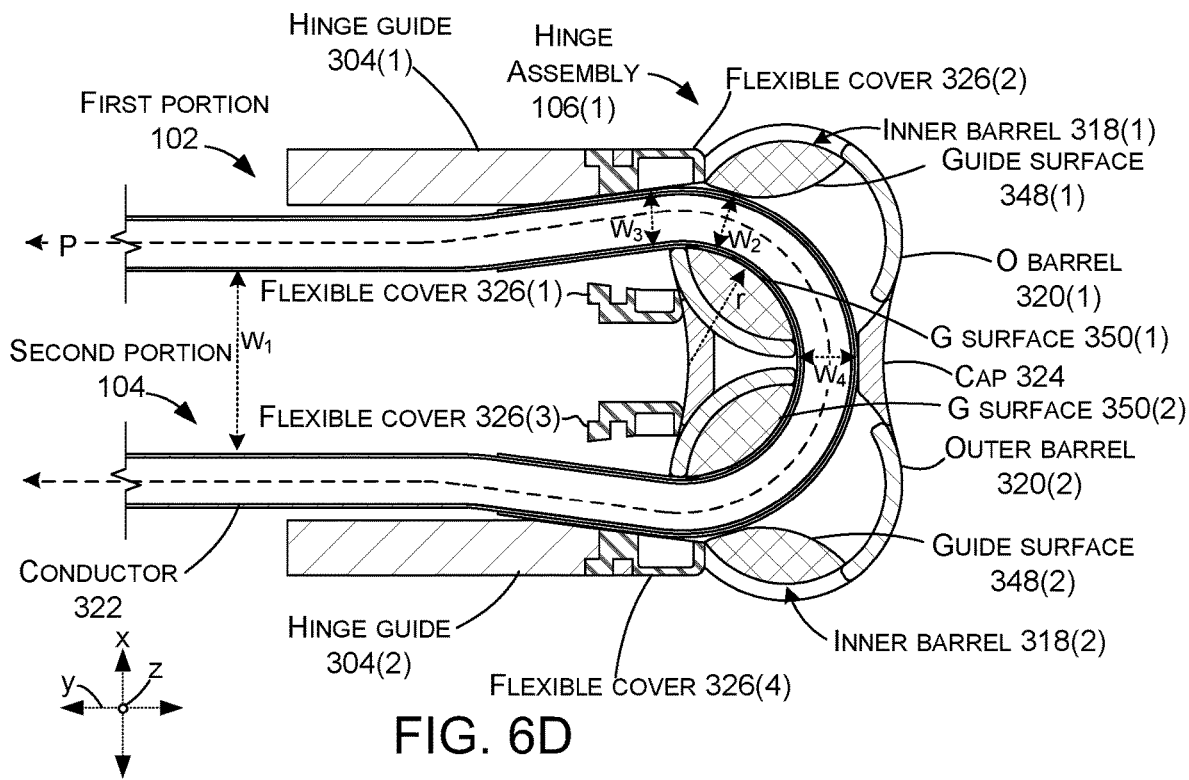

Looking at FIG. 6D, the guide surfaces 348 and 350, along with outer barrels 320 are defining the path P through the hinge assembly 106(1). Note further that guide surfaces 350(1) and 350(2) are collectively defining a minimum bend radius 'r' for the conductor 322 through the hinge assembly 106(1). The minimum bend radius is almost as wide as the hinge assembly 106. For instance, the minimum bend radius has a diameter D (e.g., $2r$) that is greater than a distance or width $W_1$ between the conductor 322 in the first and second portion 102 and 104 in this closed position. The relatively large minimum bend radius can protect the conductor from crimping and/or other damage as the first and second portions are rotated through a range of rotation, such as zero-degrees to 360-degrees.

Note that in the illustrated implementation, a width $w_2$ between guide surfaces 348(1) and 350(1) and 348(2) and 350(2) is approximately equal to a width $w_3$ of the conductor 322 in the hinge assembly 106(1). Similarly, a width $w_4$ between cap 324 and outer barrels 320(1) and 320(2) is also approximately equal to widths $w_2$ and $w_3$. This configuration allows the hinge assembly 106(1) to hold or cradle the conductor in place during rotation to avoid situations where the conductor slips out of the path P and gets pinched or otherwise damaged.

Note also that path P protects the conductor 322 from damage due to twisting because in this implementation the path P is contained within a plane that is parallel to the xy-reference plane (e.g., there is no z-reference axis change along the path). Thus, the conductor is only exposed to a single axis of rotation (e.g., around the hinge axis(s)) and is not subject to twisting. Stated another way, in this implementation, path P is straight, allowing for different length management techniques of the conductor 322 through the range of motion that would not otherwise be allowed if the conductor was required to make a sharp corner adjacent to the bending location. Depending on the construction of the conductor, this length change management made possible by path P can be critical for the long-term reliability of the conductor. Further, flexible covers 326(2) and 326(4) are sealing between the hinge guides 304 and the outer barrels 320 to prevent debris from entering the hinge assembly 106(1).

Figure 6E:
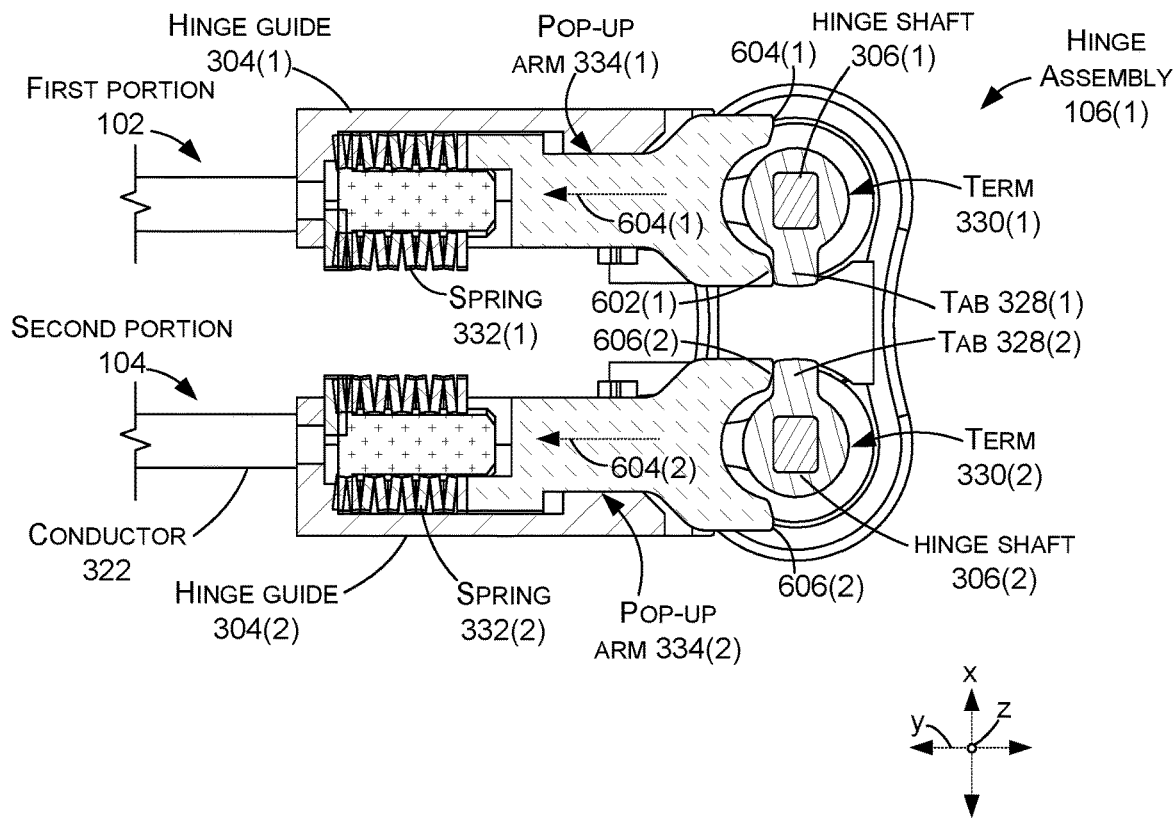

FIG. 6E shows tabs 328 of the hinge shafts 306 engaging surfaces 602 of the pop-arms 334. This engagement is forcing the pop-up arms 334 to the left (as indicated by arrow 604). The leftward movement of the pop-up arms 334 is compressing the springs 332 and causing the springs to exert an opposing force in the opposite direction (e.g., a pop-up force). (As will be shown in FIG. 7E, the contact (and hence pop-up force ceases when the first and second portions 102 and 104 are rotated to about 30 degrees. While not specifically shown, similar contact between the tabs 328 and surfaces 606 starting at about 330 degrees can similarly force the pop-up arms to compress the springs. This compression of springs 332 creates a pop-up force on the first and second portions from 360-degrees to 330-degrees.) Alternatively, a device implementation can employ pop-up asymmetrically. For instance, the device might include the pop-up feature when closed at the zero-degree orientation, such as with displays facing inwardly, but not at the 360-degree orientation, such as with the displays facing outwardly, for example. Further, the degree of pop-up from zero degrees could be different than from 360 degrees. For instance, the pop-up could be zero to 30 degrees versus 360 to 340 degrees.

Figure 6F:
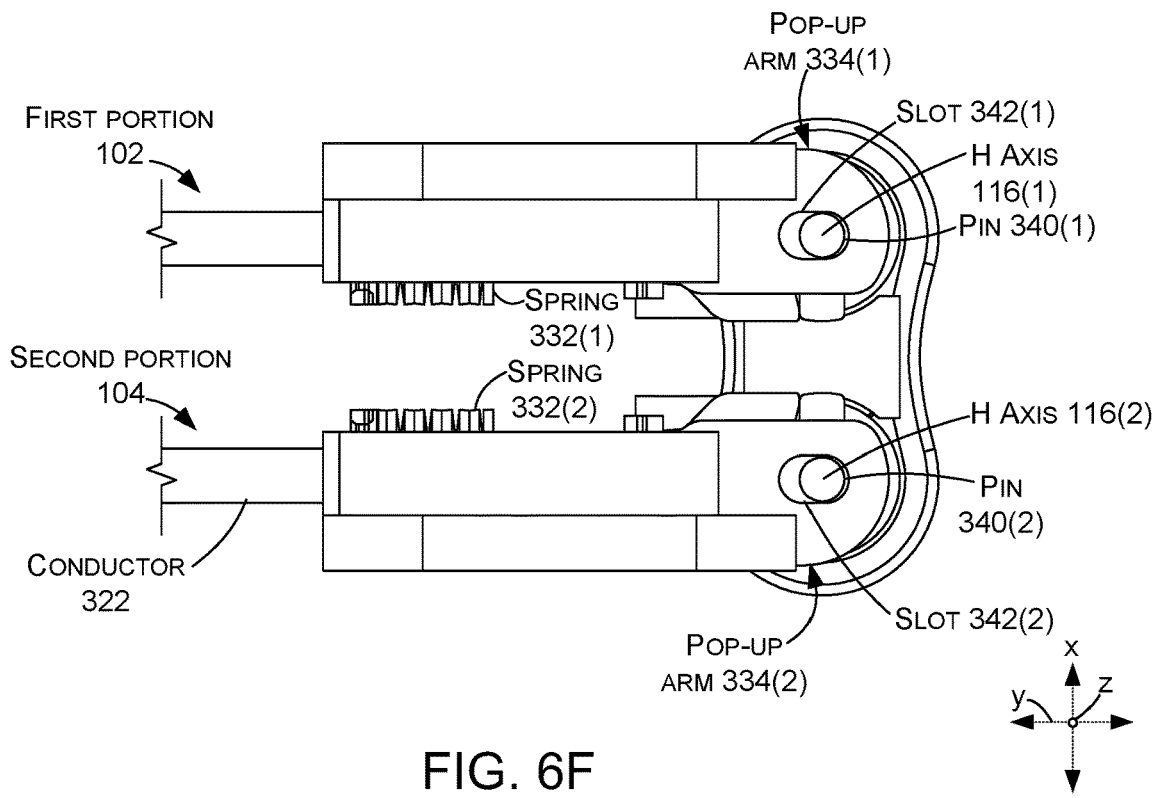

FIG. 6F shows the movement of the pop-up arms 334 relative to the hinge axes 116. Specifically, note that the elongate slots 342 in the pop-up arms 334 have shifted to the left (e.g., the pins 340 (of the terminals 330 of FIG. 6E) are positioned at the extreme right of the slots 342). Thus, the pop-up arms 334 have been moved to the left and are compressing springs 332. Further, the slots 342 can facilitate movement of the pop-up arms 334 along the length of the slots while constraining movement of the pop arms in other directions, such as the x-reference direction. This ability to facilitate movement in one direction while constraining movement in other directions can focus the energy in the springs 332 for use as pop up torque.

Figure 7A:
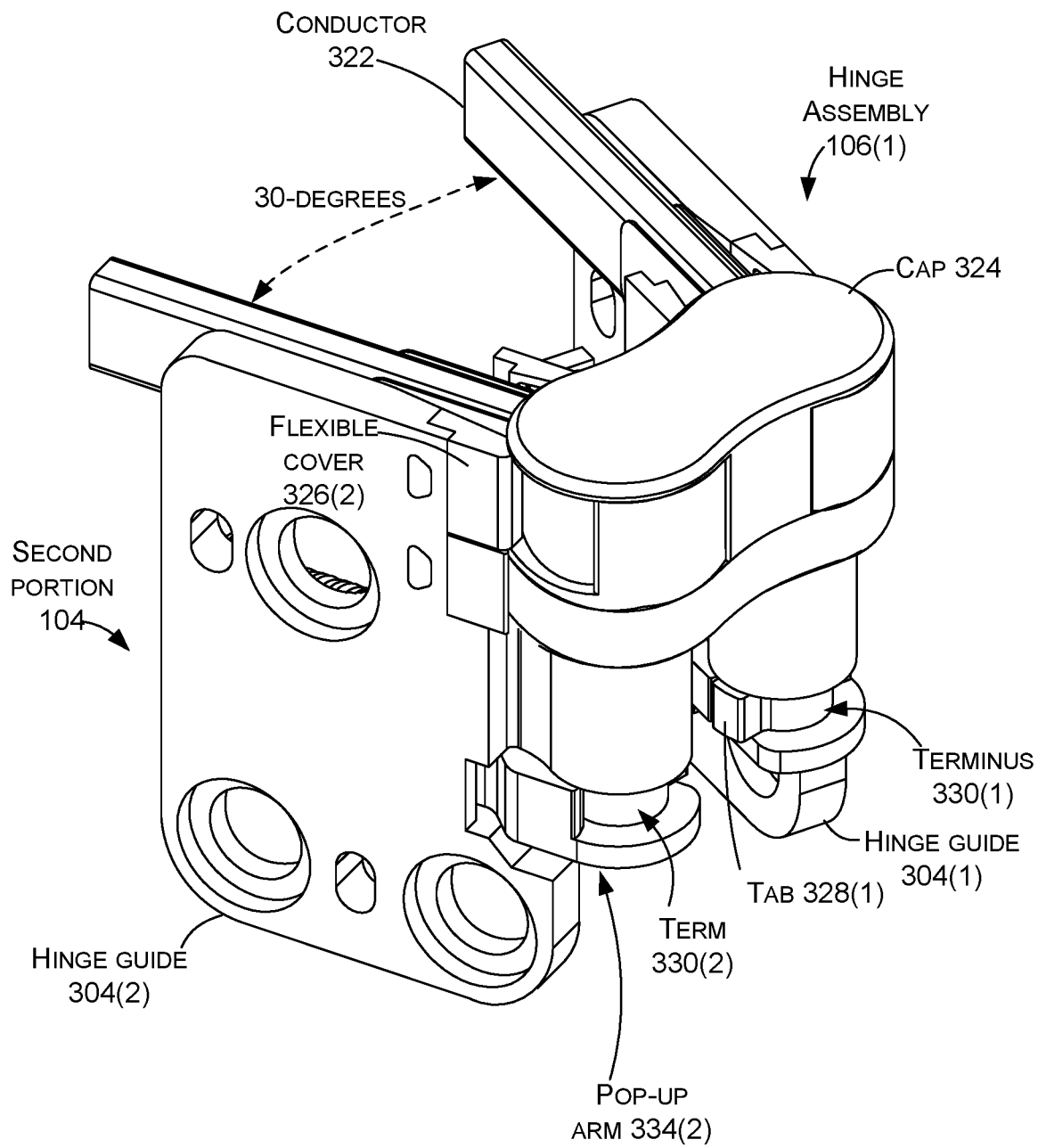
Figure 7B:
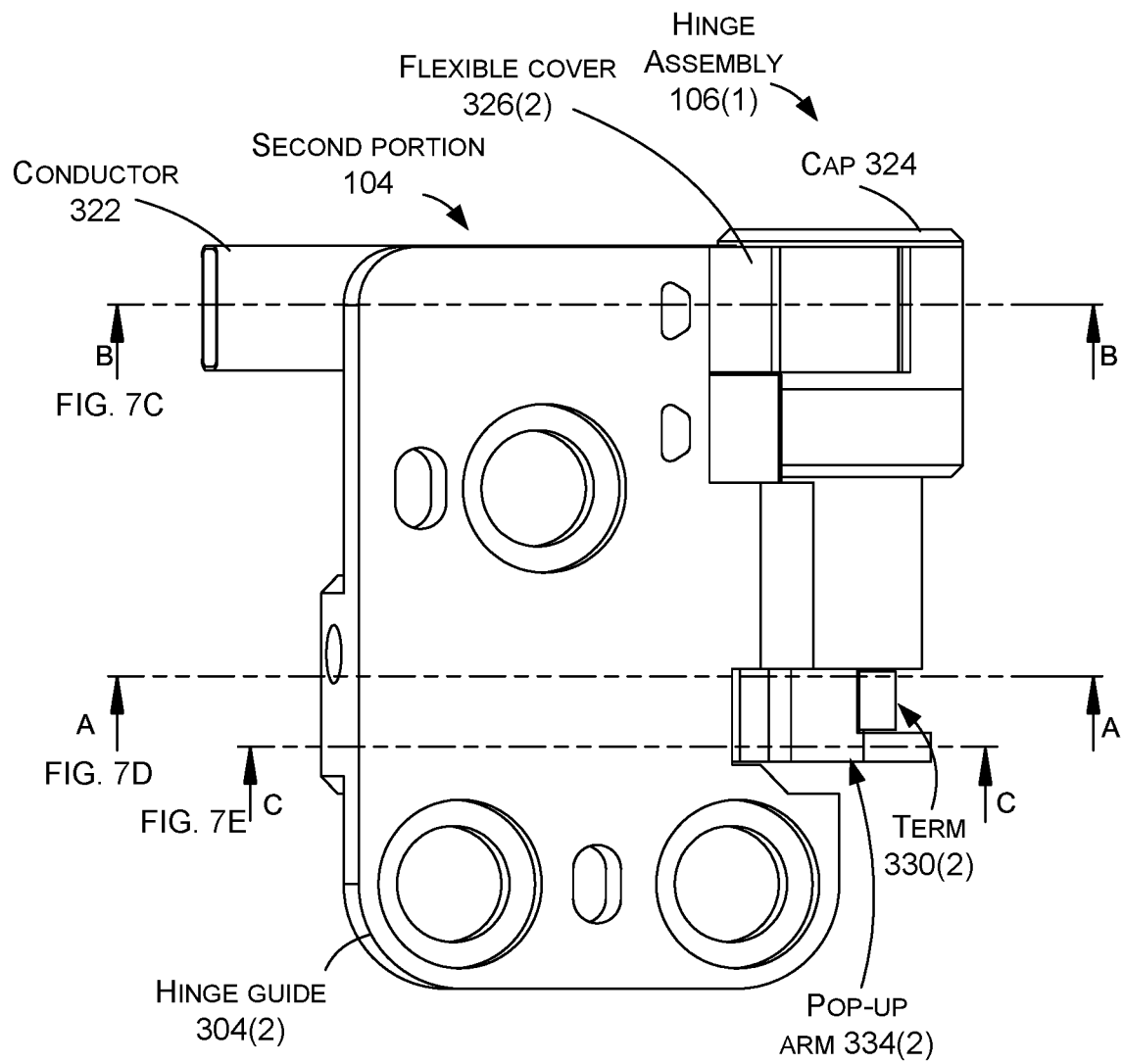
Figure 7C:
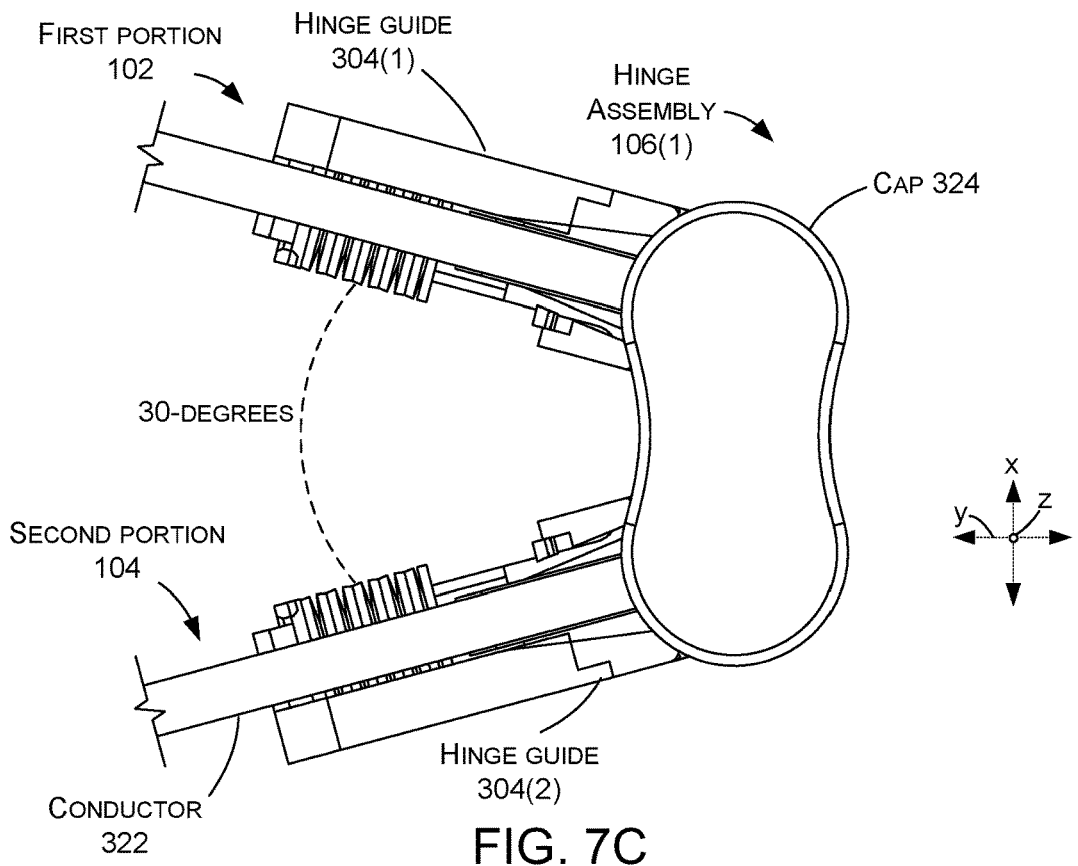
Figure 7D:
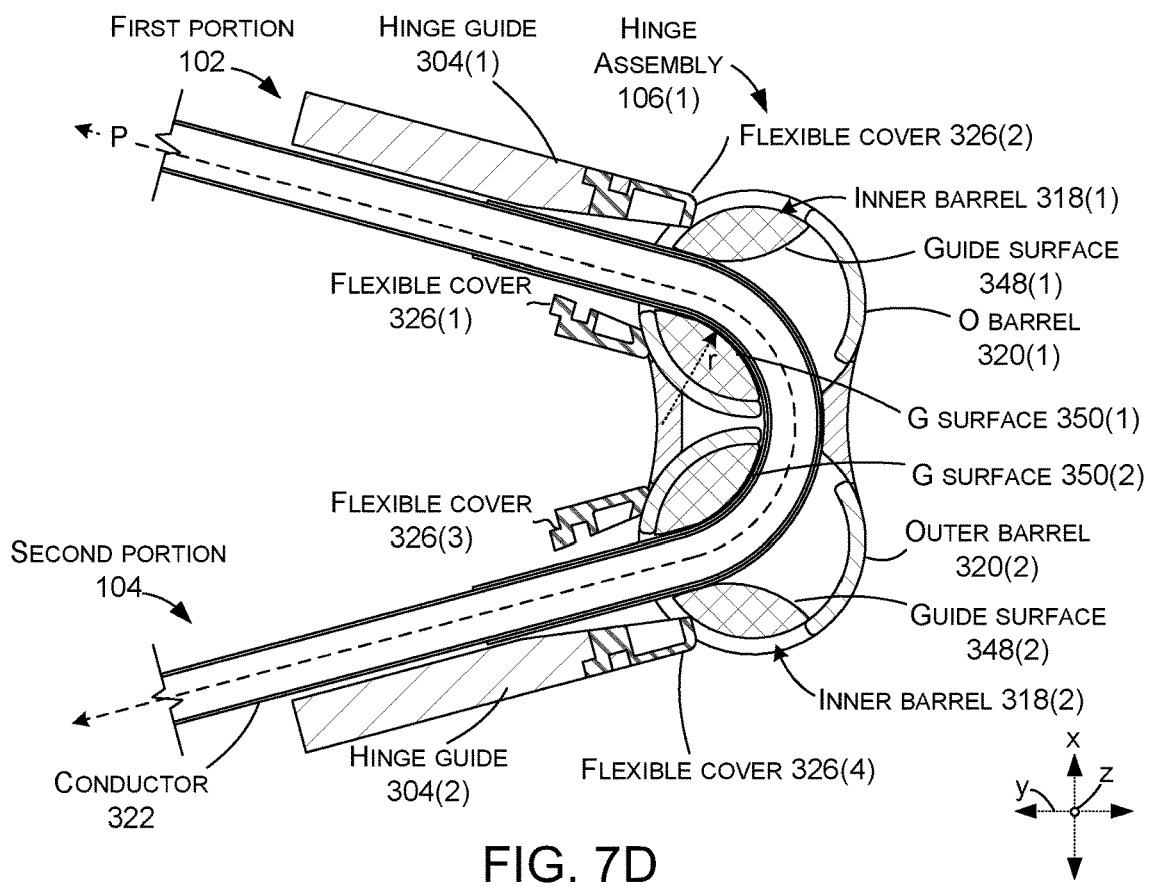

FIGS. 7A-7F show the first and second portions 102 and 104 rotated about 30 degrees from the zero-degree orientation of FIGS. 6A-6F. Specifically, about 15 degrees of rotation has occurred around each hinge axis 116. As shown in FIG. 7D, the guide surfaces 348 and 350 are continuing to define conductor path P including the bend radius r through the hinge assembly 106(1). The flexible covers 326 can allow slight relative movement between the conductor 322 and the hinge assembly 106(1) while sealing between the first and second portions 102 and 104 and the hinge assembly 106(1) to prevent debris from entering the inner barrels 318 and the outer barrels 320.

Figure 7E:
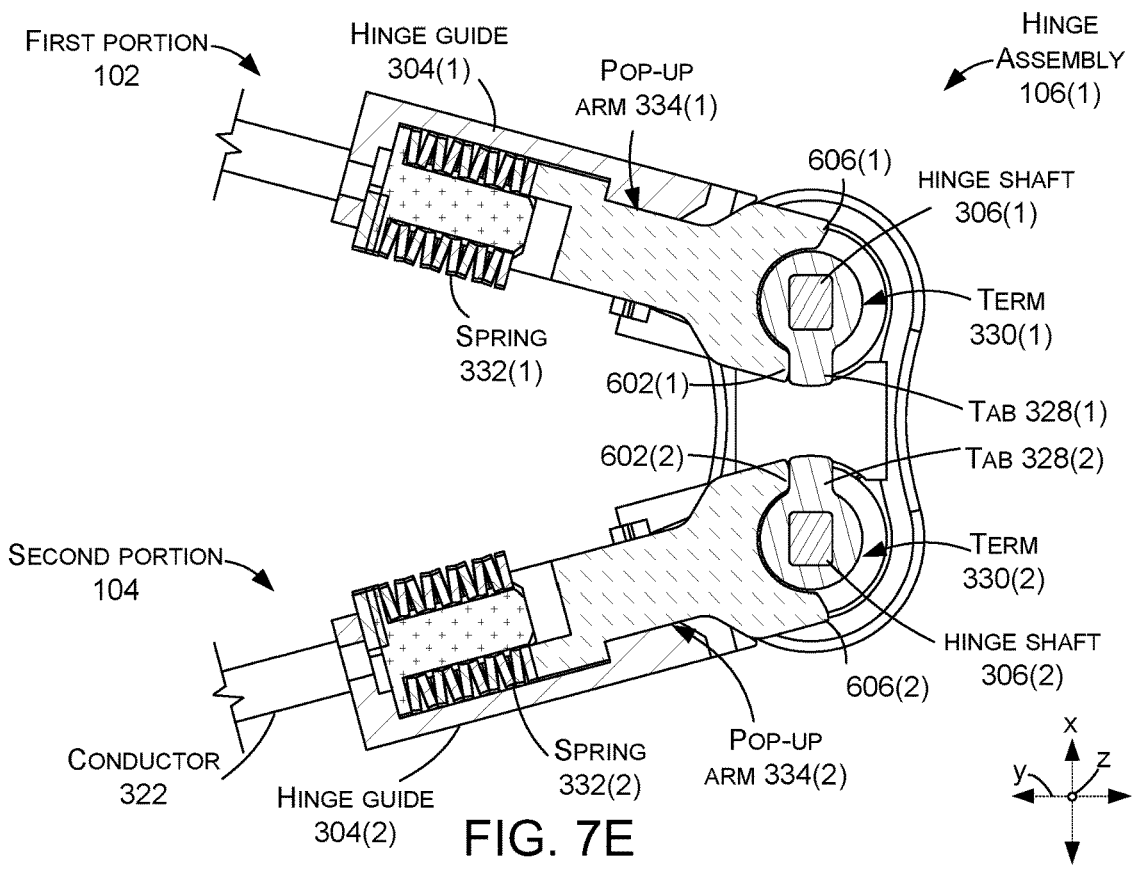
Figure 7F:
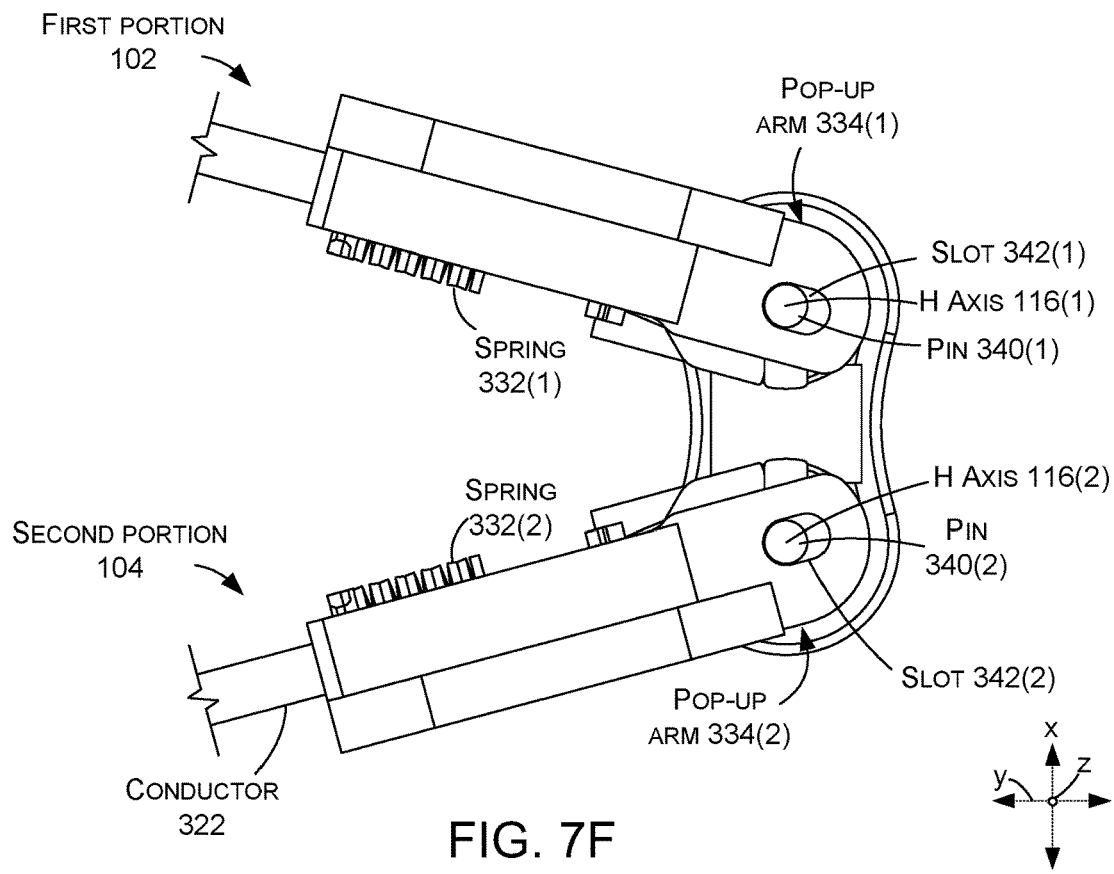
Figure 8A:
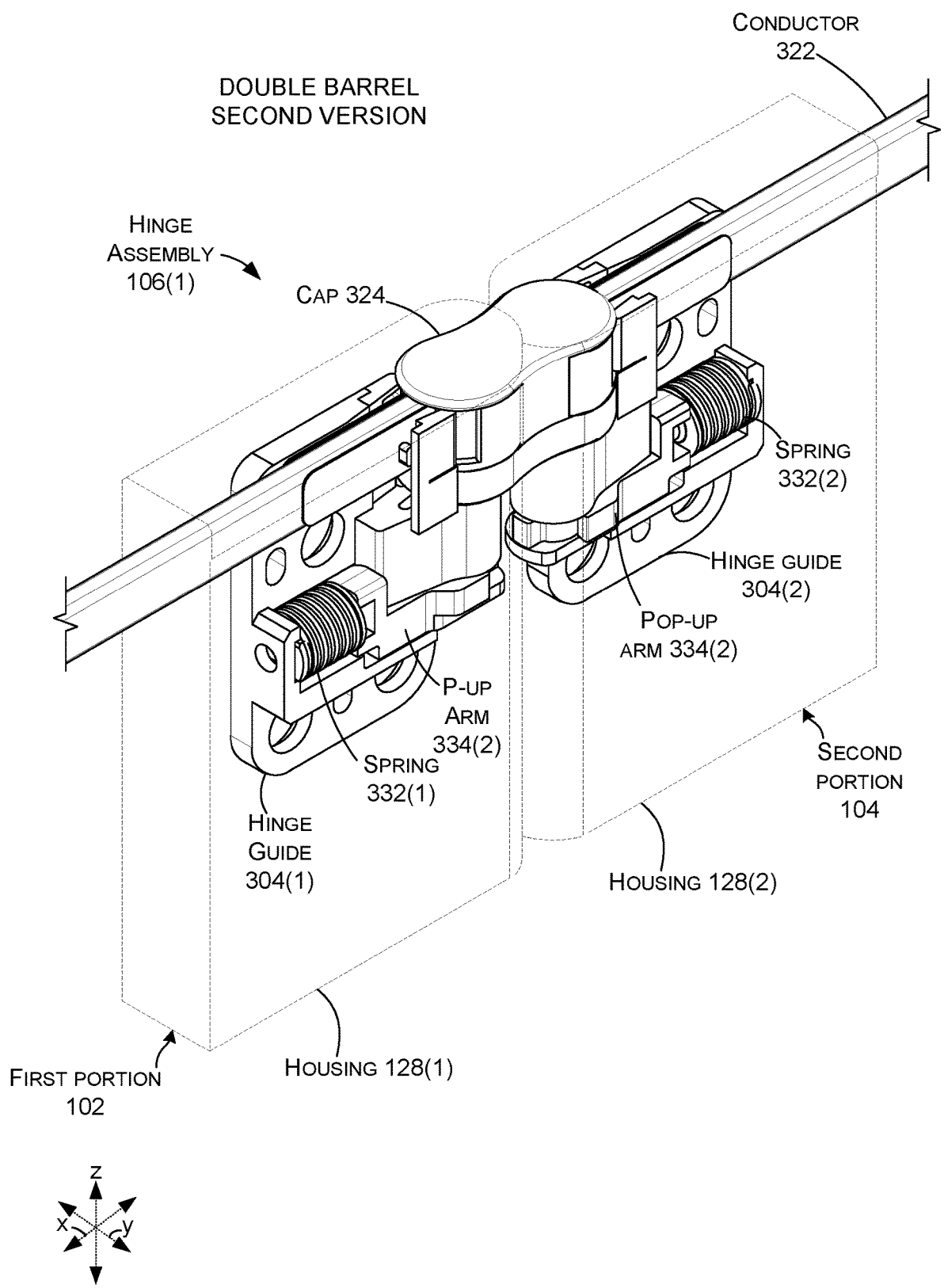

FIGS. 7E and 7F show the rotation of the first and second portions 102 and 104 around hinge axes 116(1) and 116(2) has progressed until the springs 332 are no longer compressed. Specifically, the springs 332 have exerted a (pop-up) force on the pop-up arms 334. The pop-up arms 334 have pushed on the tabs 328 causing rotation of the first and second portions around the hinge axes. This rotation is rotating the tabs 328 away from the surfaces 602 of the pop-up arms 334. The springs 332 are forcing the pop-up arms to the right as reflected by the fact that the pins 340 have moved from the right-most extreme of the elongate slots 342 to the left-most extreme. At this point, the contact between tabs 328 and surfaces 602 is ending and thus the pop-up force is ending. Stated another way, the first and second portions can rotate through a range of rotations, such as from 0-360 degrees. For a first sub-range of this rotation from zero degrees to 30 degrees the springs were imparting a pop-up force on the hinge shafts 306 to rotate the first and second portions apart. Now, for another sub-range of rotation starting at 31 degrees there is no pop-up force and rotation around the hinge axes is determined by factors such as friction between the hinge shafts and the hinge guides (see discussion relative to FIGS. 3A and 3B). Note that as mentioned above, the first sub-range of rotation may resume, such as from 330 degrees to 360 degrees when the tabs 328 encounter surfaces 606.

FIGS. 8A-8F show the first and second portions 102 and 104 rotated to a 180-degree orientation with the first and second portions abutting one another (e.g., touching or with a slight gap).

FIG. 8D shows the inner and outer barrels 318 and 320 continuing to define the path P of the conductor 322 through the hinge assembly 106(1). Note that as rotation of the first and second portions 102 and 104 has progressed from the zero-degree orientation of FIGS. 6A-6F to the 180-degree orientation that the path P has not imparted any z-axis rotation on the conductor 322. Further, flexible covers 326(1)-326(4) are blocking entry of debris into the hinge assembly 106(1) proximate to the conductor 322 (e.g., along path P).

FIGS. 8E and 8F show the tabs 328 are not engaging surfaces 602 or 606 and the springs 332 are uncompressed in this open orientation.

Various examples are described above. Additional examples are described below. One example includes a device comprising of a first portion and a second portion that are rotatably coupled to rotate around first and second hinge axes from a closed orientation to an open orientation. The device can also include a first barrel positioned to rotate around the first hinge axis and defining a first guide surface and a second barrel positioned to rotate around the second hinge axis and defining a second guide surface. The device can also include a conductor spanning between the first and second portions along a path collectively defined by the first and second guide surfaces.

Another example can include any of the above and/or below examples where the first barrel comprises nested first inner and first outer barrels and the second barrel comprises nested second inner and second outer barrels.

Another example can include any of the above and/or below examples where in the closed orientation, the path defines a minimum bend radius of the conductor that is greater than one half a distance between the conductor in the first and second portions.

Another example can include any of the above and/or below examples where in a range of rotation from the closed orientation to the open orientation, the conductor is maintained in a plane that is transverse to the first and second hinge axes.

Another example can include any of the above and/or below examples where the device further comprises a first flexible cover extending between the first portion and the first barrel and a second flexible cover extending between the second portion and the second barrel.

Another example can include any of the above and/or below examples where the device further comprises opposing first and second flexible covers extending between the first portion and the first barrel and opposing third and fourth flexible cover extending between the second portion and the second barrel.

Another example can include any of the above and/or below examples where the first barrel defines a third guide surface and the second barrel defines a fourth guide surface.

Another example can include any of the above and/or below examples where the first and second guide surfaces collectively define a first side of the path and the third and fourth guide surfaces collectively define an opposing second side of the path.

Another example can include any of the above and/or below examples where the device further comprises a force generating element.

Another example can include any of the above and/or below examples where the force generating element comprises a spring.

Another example can include any of the above and/or below examples where the device further comprises a force transferring element that conveys force from the force generating element to the first and second portions for a first sub-range of rotation between the closed orientation and the open orientation, and wherein the force transferring element does not convey the force during a second sub-range of rotation.

Another example can include any of the above and/or below examples where the first sub-range of rotation is zero-degrees to 30-degrees and 331-degrees to 360-degrees and wherein the second sub-range of rotation is 31-degrees to 330-degrees.

Another example can include any of the above and/or below examples where the force transferring element comprises a pop-up arm.

Another example can include any of the above and/or below examples where the force transferring element comprises a first pop-up arm that operates relative to the first hinge axis and a second pop-up arm that operates relative to the second hinge axis.

Another example can include any of the above and/or below examples where the device further comprises a communication member that defines first and second hinge shafts that extend along the first and second hinge axes.

Another example can include any of the above and/or below examples where the first hinge shaft defines a first tab and the second hinge shaft defines a second tab.

Another example can include any of the above and/or below examples where engagement between the first tab and the pop-up arm and engagement between the second tab and the second pop-up arm creates the force in the first sub-range of rotation.

Another example can include a device comprising of a first portion and a second portion that are rotatably coupled via a hinge shaft that includes a tab extending orthogonally from the hinge shaft. The device can also include a spring. The device can also comprise of a force transferring element extending between the spring and the tab and compressing the spring when engaging the tab and thereby creating a force to rotate the first and second portions away from one another.

Another example can include any of the above and/or below examples where the force transferring element comprises a pop-up arm.

Another example can include a device comprising of a hinge assembly that rotatably secures a first portion and a second portion relative to a hinge axis and defines a planar conductor path between the first and second portions through the hinge assembly and a pop-up arm that compresses a spring when the first portion and the second portion are rotated to a closed orientation, and wherein the compressed spring creates a bias to rotate the first and second portions from the closed orientation to an open orientation.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-8F.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion that are rotatably coupled to rotate around first and second hinge axes from a closed orientation to an open orientation;
a first barrel positioned to rotate around the first hinge axis and defining a first guide surface and a second barrel positioned to rotate around the second hinge axis and defining a second guide surface;
a first flexible cover extending between the first portion and the first barrel and a second flexible cover extending between the second portion and the second barrel; and, a conductor spanning between the first and second portions along a path collectively defined by the first and second guide surfaces.

2. The device of claim 1, wherein the first barrel comprises nested first inner and first outer barrels and the second barrel comprises nested second inner and second outer barrels.

3. The device of claim 1, wherein in a range of rotation from the closed orientation to the open orientation, the conductor is maintained in a plane that is transverse to the first and second hinge axes.

4. The device of claim 1, wherein the first barrel defines a third guide surface and the second barrel defines a fourth guide surface.

5. The device of claim 4, wherein the first and second guide surfaces collectively define a first side of the path and the third and fourth guide surfaces collectively define an opposing second side of the path.

6. The device of claim 1, further comprising a force generating element.

7. The device of claim 6, wherein the force generating element comprises a first spring relative to the first hinge axis and a second spring relative to the second hinge axis.

8. The device of claim 7, further comprising a force transferring element that conveys force from the force generating element to the first and second portions for a first sub-range of rotation between the closed orientation and the open orientation, and wherein the force transferring element does not convey the force during a second sub-range of rotation.

9. The device of claim 8, wherein the first sub-range of rotation is zero-degrees to 30-degrees and 331-degrees to 360-degrees and wherein the second sub-range of rotation is 31-degrees to 330-degrees.

10. The device of claim 8, wherein the force transferring element comprises a pop-up arm.

11. The device of claim 8, wherein the force transferring element comprises a first pop-up arm that operates relative to the first hinge axis and a second pop-up arm that operates relative to the second hinge axis.

12. The device of claim 11, further comprising a communication member that defines first and second hinge shafts that extend along the first and second hinge axes.

13. The device of claim 12, wherein the first hinge shaft defines a first tab and the second hinge shaft defines a second tab.

14. The device of claim 13, wherein engagement between the first tab and the first pop-up arm moves the first pop-up arm to compress the first spring to create the force in the first sub-range of rotation, and engagement between the second tab and the second pop-up arm moves the second pop-up arm to compress the second spring to create the force in the first sub-range of rotation.

15. A device, comprising:
a hinge assembly that rotatably secures a first portion and a second portion relative to a hinge axis and defines a planar conductor path between the first and second portions through the hinge assembly, the hinge assembly including a first flexible cover extending between the first portion and a first barrel and a second flexible cover extending between the second portion and a second barrel; and,
a pop-up arm that compresses a spring when the first portion and the second portion are rotated to a closed orientation, and wherein the compressed spring creates a bias to rotate both the first and second portions from the closed orientation to an open orientation upon activation of a user controllable lock.

\* \* \* \* \*